US008064898B2

(12) United States Patent
Carnall

(10) Patent No.: US 8,064,898 B2
(45) Date of Patent: Nov. 22, 2011

(54) CALL MANAGEMENT IN A TELECOMMUNICATIONS SYSTEM

(76) Inventor: Murat Carnall, Leeds (GB)

( * ) Notice: Subject to any disclaimer, the term of this patent is extended or adjusted under 35 U.S.C. 154(b) by 987 days.

(21) Appl. No.: 11/764,696

(22) Filed: Jun. 18, 2007

(65) Prior Publication Data

US 2008/0132226 A1   Jun. 5, 2008

(51) Int. Cl.
*H04W 24/00* (2009.01)
(52) U.S. Cl. ........ 455/423; 370/428; 370/338; 380/286; 455/456.1; 455/410; 455/445; 340/539.13; 340/528; 340/531; 340/573.1; 340/521; 348/143
(58) Field of Classification Search ............ 702/62; 236/377; 340/517, 573, 925; 710/16, 18; 455/423
See application file for complete search history.

(56) References Cited

U.S. PATENT DOCUMENTS

| | | | | |
|---|---|---|---|---|
| 5,428,667 A | * | 6/1995 | Easterling et al. | 455/410 |
| 5,850,451 A | * | 12/1998 | Sudia | 380/286 |
| 6,131,032 A | * | 10/2000 | Patel | 455/445 |
| 7,206,300 B2 | * | 4/2007 | Liu et al. | 370/338 |
| 2002/0057340 A1 | * | 5/2002 | Fernandez et al. | 348/143 |
| 2002/0077128 A1 | * | 6/2002 | Okun et al. | 455/458 |
| 2003/0062997 A1 | * | 4/2003 | Naidoo et al. | 340/531 |
| 2003/0223733 A1 | * | 12/2003 | Chang | 386/69 |
| 2004/0022261 A1 | * | 2/2004 | Ishwar et al. | 370/428 |
| 2004/0176100 A1 | * | 9/2004 | Florkey et al. | 455/456.1 |
| 2005/0068169 A1 | * | 3/2005 | Copley et al. | 340/539.13 |
| 2005/0152343 A1 | * | 7/2005 | Rajagopalan | 370/352 |
| 2005/0190061 A1 | * | 9/2005 | Trela | 340/573.1 |
| 2005/0210127 A1 | * | 9/2005 | Pohja et al. | 709/224 |
| 2006/0092011 A1 | * | 5/2006 | Simon et al. | 340/521 |
| 2007/0001836 A1 | * | 1/2007 | Singer et al. | 340/528 |
| 2008/0102866 A1 | * | 5/2008 | Fiorillo et al. | 455/466 |
| 2009/0232128 A1 | * | 9/2009 | Paulis et al. | 370/352 |

* cited by examiner

*Primary Examiner* — Nick Corsaro
*Assistant Examiner* — Mahendra Patel
(74) *Attorney, Agent, or Firm* — McNeely, Hare & War LLP; Kevin J. McNeely

(57) ABSTRACT

A system and method of covertly monitoring a communications device, the method that includes using a separate monitoring device to monitor a monitored communications device, without any indication of the monitoring being received by the monitored communications device.

19 Claims, 15 Drawing Sheets

| | 701 | 702 | 703 | 704 | 705 | 706 | 707 | 708 |
|---|---|---|---|---|---|---|---|---|
| | Device Number | Individual's name | Device Phone No | Third Party Phone No | Start time/date | Finish time/date | Incoming/outgoing | Content Data |
| | Mobile 1 | Not known | 00 44 114 268 7521 | 001 717 265 1529 | Oct 25, 04 10.15 | Oct 25, 04 10.25 | In | Voice data |
| | Mobile 2 | Martin Weller | 00 48 295 764 5004 | 00 45 159 752 4004 | Oct 25, 04 10.28 | Oct 25, 04 10.28 | Out | SMS message |
| | Mobile 3 | Simon Frith | 00 45 372 729 4116 | 00 29 172 282 2885 | Oct 25, 04 10.37 | Oct 25, 04 10.37 | In | MPEG video data |

| Mobile N | Richard Beck | 0752 768 2953 | 00 34 953 246 2810 | Oct 25, 04 11.20 | Oct 25, 04 11.21 | In | JPEG Image |

Fig. 7

CALL MANAGEMENT IN A TELECOMMUNICATIONS SYSTEM

CROSS-REFERENCE TO RELATED APPLICATIONS

This utility patent application claims priority to international application PCT/GB2005/005021 filed on Dec. 22, 2005 and application 0428049.1 filed in Great Britain on Dec. 22, 2004, which are incorporated by reference herein.

FIELD OF THE INVENTION

The present invention relates to the field of communications, and particularly although not exclusively to control and/or monitoring of personal mobile communications devices.

BACKGROUND TO THE INVENTION

Modem communication systems and modern work methods often involve communications between corporate employees and corporate customers by various means, including e-mail, voice calls, picture messaging, SMS messaging, and like electronic communications. Further, there is a tendency for communications devices to increasingly become more personal and mobile, with the result that a corporation may have several communications devices operating on multiple different technologies such as GSM, WAP, G3 mobile, e-mail, internet, public service telephone network (PSTN) and other technologies. In general, employees have greater freedom to communicate digitally, and are less constrained than previously by the physical limitations of communications apparatus such as land line telephone handsets and computer terminals which can only be accessed at fixed physical points.

At the same time, increased legislation concerning fraud, employment, and professional conduct place a heavy burden on corporations in ensuring that their employees conduct business ethically, legally, and in compliance with their own internal management policies.

There is a problem that corporations are exposed to communication systems which reduce the amount of control which managers of those corporations have in managing their organization, whilst at the same time being exposed to increasing levels of regulation, legislation, and compliance requirements. There is a problem in that managers of organizations cannot monitor communications in and out of their organizations efficiently, and yet are exposed to any liability resulting from inept, illegal or incompetent activities being carried out via those incoming and outgoing communications.

A conventional known voice telecommunications system, using a local switch at an enterprise such as a corporation, office, hospital or the like provides telephone handsets having call conferencing facilities. In order to initiate a conference call, typically the user of a telephone handset needs to deliberately input a set of keypad instructions, e.g. dialing a particular number or sequence of numbers on a keypad, in order to set up and initiate a conference facility.

In other known prior art systems, for example using land line telephones over the public service telephone network (PSTN), conference calls, such as international conference calls, can be booked in advance for a particular time through various network operators. Each party to the conference call is given a separate telephone number to dial, at a pre-determined time, in order to join a multi-party conference call. Again, this requires the person wishing to join the conference call or to initiate the conference call typing a specific keypad sequence of numbers or digits in order to set up or join a conference call.

In each of the above cases, the persons who are party to the conference call, and who are initiating' a communications call are in control of the conferencing facility, that is, it set up, duration and termination, and are fully aware that they are party to a conference call. Parties to the conference call can terminate or edit the conference call as they see fit. Such features are common place in prior art telecommunications systems.

It is known in prior art mobile wireless networks having a plurality of base stations and a plurality of mobile telephone handsets, for the network operator to be able to disable a particular mobile handset remotely. This might occur where the user reports that mobile handset as having been stolen, and therefore wishes to prevent the new (illegal) user of the mobile handset accruing call charges to the true user's account. Disabling of the mobile phone is effected by disabling the SIM card in the phone remotely from a network management console. This is known as "zapping" the phone or SIM card. However, this feature is a relatively crude on/off enablement and disablement facility. The new, illegal user of the phone and/or SIM card are immediately aware when the phone has been interfered with by the network operator, since it becomes disabled and will not operate. Typically, once "zapped", by being disabled, the phone and SIM card will be thrown away, since the illegal user is aware that the phone can now no longer be used.

It is known in the United Kingdom, that during times of national emergency, civil unrest, or terrorist alert, there are national broadcast systems in place for disseminating warnings and alert messages to the general public, and to key military and/or civilian individuals. Included in such systems are provisions to deliver mobile local or national alerts from radio stations to mobile wireless devices from radio and television stations in the event of national emergency or other national or regional alert, on behalf of national or regional government or local councils. Such systems are derived from the emergency broadcasting system (EBS), initially developed following the Second World War, in the US and subsequently revised and termed the emergency alert system (EAS) in or around 1997.

SUMMARY OF THE INVENTION

According to a first aspect, there is provided a method of automatically monitoring a wireless communications device, the method comprising: whenever the monitored wireless communications device experiences a change of state, automatically reporting the change of state to a separate monitoring device.

A change of state may comprise an interaction with another entity, and/or may comprise an operation of the wireless communications device. A change of state may comprise receiving a communication from another entity. A change of state may comprise sending a communication. A change of state may comprise an input of data to the monitored device via a key pad comprising the monitored device. A change of state may comprise an input of voice signals from a human user of the monitored device, via a microphone device comprising the monitored device.

A monitored change of state may comprise capture of a moving or still image via a camera device comprising the monitored communications device.

The reporting may be carried out without any external evidence of the reporting being presented to a user of the monitored device.

The reporting of the change of state of the monitored device may be reported automatically, without any indication of the reporting being received by the monitored communications device.

Preferably, but not essentially, the monitoring of the monitored communications device is carried out covertly.

The method may further comprise, in response to a reported change of state of the monitored communications device, remotely performing a further operation of the monitored device from a remote location, in which a user of the monitored device becomes aware that the monitored device is being monitored.

A communication may be monitored by the monitoring device substantially in real time.

A configuration of the monitored communications device may be monitored.

A monitored operation of the monitored device may comprise a voice call.

The monitoring device may comprise a mobile phone handset.

The monitoring device may comprise a recording device capable of recording voice data.

The method may comprise monitoring a start time of an operation of the device. The method may comprise recording an end time of an operation of the monitored device. The method may comprise recording an identification data identifying at least one monitored communications device. The method may further comprise performing a search of a monitoring device, to search a parameter selected from the set; date of an operation; start time of an operation; an operation finish time; time duration of an operation; number called; a calling number.

A monitoring device may be configurable to a mode in which every incoming and outgoing call of a monitored device is covertly monitored.

A monitored operation of the monitored device may be selected from the set including but not limited to: a text message; an SMS message; an MMS message; an EMS message; a photo; a video clip; a voice call; a fax message; an e-mail message; a configuration message for configuring a monitored device; Bluetooth or similar.

A monitored communication may be carried over a communications network selected from the set including but not limited to: a mobile wireless network; a code division multiple access (CDMA) wireless network; a Groupe Systeme Mobile wireless network; a G3 wireless network; an emergency broadcasting system (EBS) network; an emergency alert system (EM) network.

According to a second aspect there is provided apparatus for covertly monitoring a communications device, the apparatus comprising:
monitoring means for monitoring a change of state of the monitored communications device, without any indication of the monitoring being received by the monitored communications device.

According to a third aspect there is provided a monitoring device for monitoring a terminal communications device, the monitoring device comprising:
a display device for displaying monitored parameters;
a user interface data entry means for entering data for monitoring the terminal communications device,
wherein the user interface is configured to display a menu of selectable items selected from the set:
deletion of a monitored terminal communications device;
addition of a terminal communications device for monitoring;
setting recording or non recording of communications data of a terminal communications device; and
searching a list of monitored parameters.

A search mode of the monitoring device for searching data relating to a monitored terminal communications device may comprise searching parameters selected from the set: start time of a monitored call; end time of a monitored call; date of a monitored call; duration of a monitored call; a number of a monitored communication terminal device; a number of a calling communications device, calling the monitored communications terminal device.

According to a fourth aspect there is provided a method of covertly monitoring a call between a first communications device and a second communications device, the method comprising:
detecting a call between the first and second communications devices;
upon detecting the call between the first and second communications devices, automatically dialing a call monitoring device;
receiving at the call monitoring device, the call between the first and second communications devices;
wherein the call between the first and second communications devices is monitored by the monitoring device, without any indication of the monitoring being received by the first or second communications devices.

According to a fifth aspect there is provided apparatus for covertly monitoring a call between a first communications device and a second communications device, the apparatus comprising:
means for detecting a voice call between the first and second communications devices;
a call monitoring device capable of monitoring the call between the first and second communications devices without any indication of the monitoring being received by the first or second communications devices; and
means for automatically dialing the call monitoring device upon detecting the call.

The first communications device may comprise a first mobile phone handset. The second communications device may comprise a mobile phone handset. The monitoring device may comprise a mobile phone handset.

The monitoring device may comprise a recording device capable of recording voice data. The monitoring device may comprise a recording device capable of recording a start time of the call, or an end time of a call.

The monitoring device may be configured to record an identification data identifying the first and/or second communications device.

According to a sixth aspect there is provided a telecommunications device configured to communicate with a first set of telecommunications devices and a second set of telecommunications devices, each of the first and second sets comprising at least one telecommunications device, wherein:
a communication with a member of the first set of telecommunications devices is configured to be transmitted to at least one device of the second set of telecommunications devices without the operator of the member of the first set of telecommunications devices being required to knowingly effect the transmission of the communication.

According to a seventh aspect there is provided a communications system comprising:
a first communications terminal device;
a monitoring device for monitoring communications conducted by the first communications terminal device; and
a controller means for controlling monitoring of communications of the first communications terminal device by the monitoring device.

The controller means may comprise a data base storing data identifying the first communications terminal device and the monitoring device.

The controller may be configured to store data describing one or more other terminal devices with which the first communications terminal device is operable to communicate with.

The first communications terminal device may comprise a mobile phone handset.

The controller device may be capable of remotely controlling the monitored device to selectively enable or disable aspects of functionality of the device.

According to an eighth aspect there is provided a method of selectively prohibiting communications on a monitored communications device, the method comprising:
using a controller device to apply a prohibition policy to the monitored communications device, for prohibiting specified communications types to and/or from the communications device.

The prohibition policy may comprise applying a call bar on all outgoing calls.

The prohibition policy may comprise applying a call bar on outgoing communications from the monitored device to a further communications device identified in a pre-stored list.

The prohibition policy may comprise applying a call bar on all incoming calls.

The prohibition policy may comprise applying a call bar on incoming communications from the monitored device to a further communications device identified in a pre-stored list.

According to a ninth aspect there is provided a method of covertly monitoring a communications device, the method comprising:
for each or any operation of the monitored communications device, using a separate monitoring device to monitor the monitored communications device, without any indication of the monitoring being received by the monitored communications device.

Upon a communication being received by or sent from the communications device, the monitoring communications device may automatically receive the communication.

According to a tenth aspect there is provided an apparatus for automatically conferencing a call involving a mobile wireless device, the apparatus comprising:
a mobile wireless device capable of participating in a call;
a controller device capable of monitoring the mobile wireless device to determine when an interaction or operation of the mobile wireless device is occurring; and
a monitoring device for monitoring the call involving the mobile wireless communications device;
wherein the controller device is capable of automatically conferencing the call involving the monitored mobile wireless device to the at least one monitoring device.

Automatic conferencing may be carried out covertly without a user of the monitored mobile device being aware of the conferencing.

The apparatus may be configured to operate either in an overt mode or a covert mode, wherein in the overt mode, in which user of the monitored device is aware that conferencing is carried out; and when in the covert mode, the conferencing is automatically carried out, without a user of the monitored device being aware that a conferencing operation is being earned out.

According to an eleventh aspect there is provided a portable wireless communications device configured for provision of communications services to a first subscriber, and configured for provision of monitoring of the communications to a second subscriber, the device comprising:
a first set of lines assigned to the first subscriber for provision of services chargeable to the first subscriber; and
a second set of lines assigned to a second subscriber for provision of monitoring services provided to the second subscriber,
wherein, the device is configured such that the existence of the second set of lines is concealed from the first subscriber.

The device may comprise a SIM card, wherein the first and second sets of lines are each allocated to the SIM card.

The device may comprise a first SIM card port, readily accessible by a user 5 of the device; and a second SIM card port, the second SIM card port being concealed within the device.

The device may comprise a first SIM card port, readily accessible by a user of the device; and a second SIM card port, the second SIM card port being concealed within the device, wherein the second SIM card port is configured for containing a second SIM card to which are assigned a set of least one lines for providing billing of monitoring services to a subscriber of the monitoring services.

According to a twelfth aspect there is provided a billing method for charging 15 for subscriber services provided via a communications network having a monitoring facility for monitoring operations experienced by a mobile wireless device, the method comprising: assigning a first set of lines to a user of the mobile wireless device; determining costs for services accruing to the first set of lines; billing the user of the mobile wireless communications for the first set of costs; assigning a second set of lines to a second subscriber; accruing a set of costs for a monitoring service for monitoring operations of the mobile wireless device; and charging the costs accruing to the second set of services to the second subscriber.

Preferably, the existence of the second set of lines is concealed from the first subscriber. The first and second sets of lines may be assigned to a same SIM card.

The first set of lines is assigned to a first SIM card; and the second set of lines maybe assigned to a second SIM card.

The second set of lines may be assigned to a second SIM card, the second SIM card being provided concealed within a mobile wireless device.

The first set of charges may be billed on a "pay as you go" tariff. The monitoring services may be billed on a "pay as you go" tariff. The invention is of course not limited to embodiments wherein such tariffs are applied to either or both sets of charges.

Other aspects and features according to the invention are as recited in the claims herein. The features disclosed in the claims herein are incorporated into the detailed description both in the text of that description and by reference.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 7 illustrates schematically data types stored in the recording entity;

DETAILED DESCRIPTION

Figure 1:
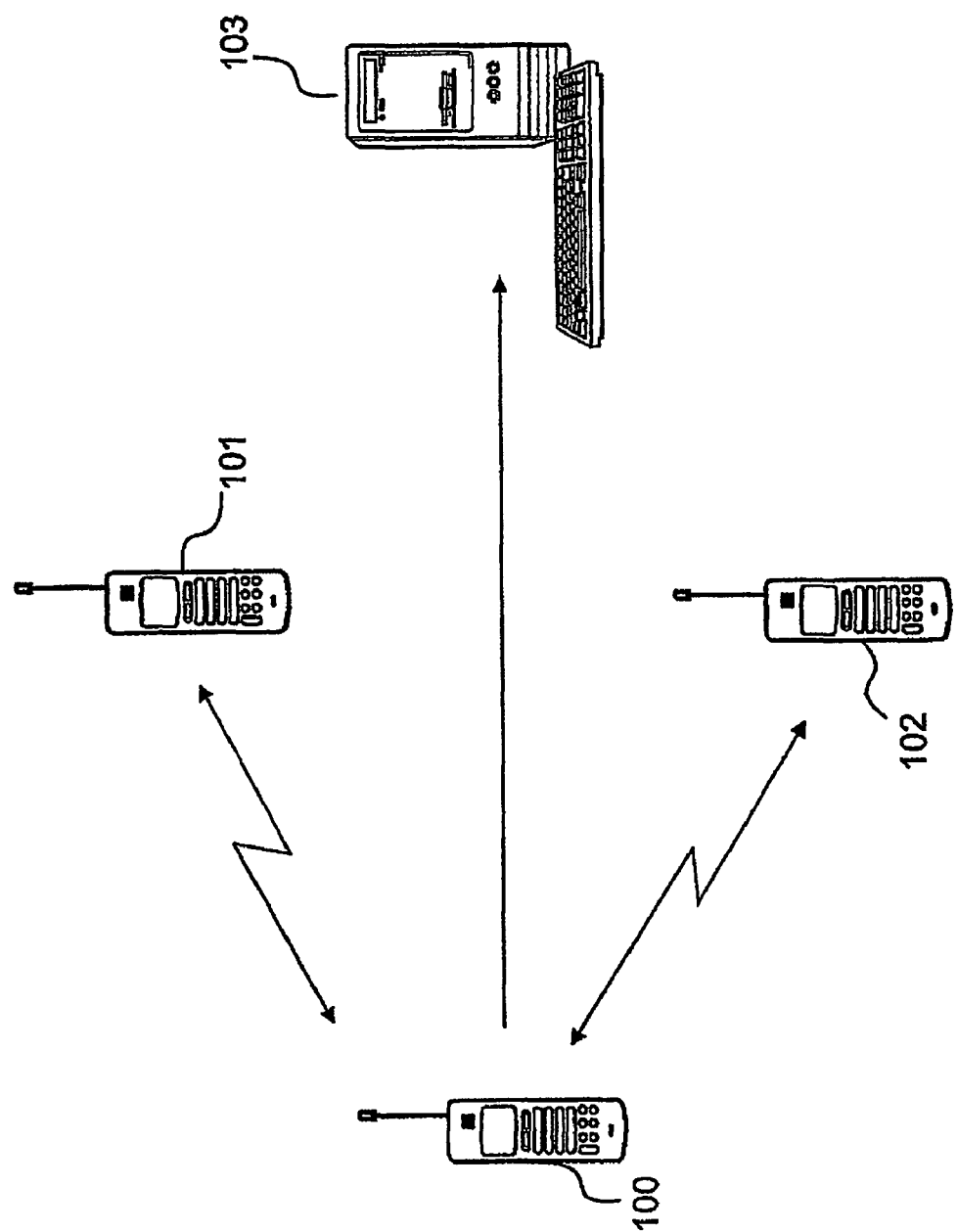
FIG. 1 illustrates schematically one specific embodiment and one specific method of a communications monitoring system for covertly monitoring communications conducted by a communications device.

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification the term "communication" refers to any type of data carried digitally. The communication may be between a first party and a second party. This could be for example voice data, fax data, e-mail data, SMS (short messaging service) text message data or other text messaging data, MSM (multimedia messaging service) or image data, for example picture data or video data. The communication may be a communications call, i.e. a communication carried over a connection between first and second communications devices.

However, in other instances, the communication may comprise data entered into a monitored device, but not actually sent to a called party.

In a general case, when a communication is made by or received by a target monitored device, for example a mobile phone, which is adapted to be subject to covert monitoring processes described herein, automatically, and without the user of the target monitored device being aware, the communication is conferenced to a monitoring device, for example another mobile phone, or a data recording device. In some embodiments, a person using the monitoring device, such as an eavesdropper, cannot participate in the communication, since that could cause accidental discovery that monitoring is taking place.

In other embodiments, the option of allowing a person monitoring the communications calls to intervene may be provided, so that the person monitoring the communications has the options of intervening in a communication, albeit that that may involve the person using the monitored communications device to become aware that the device is being externally controlled or remotely controlled and/or monitored.

In this specification the term "interaction" when used in relation to a communications device, including but not limited to a wireless communications device, means any interaction with an external entity, either human or machine, which results in the device sending or receiving information with respect to an outside environment around the device. Examples of such interactions include 5 but are not limited to: sending and receiving messages; receiving key stroke or keypad inputs from a human user; capturing data such as image data, whether stored in a memory of the device or not.

In this specification the term "operation" when used in relation to a monitored communications device means any operation of that device, whether prompted by an interaction with an external entity or as part of the internal operation of the device. Examples of operations include but are not limited to:

receiving or sending communications; turning or being turned on or off; operation of a keypad of the device; operation of a display device of the device; operation of a vibration component of the device; operation of a movable part of the device; changing of a battery; operation of an audible component of a device, e.g. a speaker or the like.

In general, in embodiments and methods described herein, a first wireless communications device is monitored by a monitoring device, which can be a second wireless communications device, whenever a change of state of the first communications device occurs. In the best mode, monitoring is covert, so that a user of the first communications device is unaware that monitoring is taking place. A person monitoring the first communications device may also seize control of selected functions of operation of the monitored first communications device, in various embodiments, and re route or censor communications intended for or sent by the first communications device. Changes of state of the monitored first communications device may include interactions with other devices or entities or operations of the device.

Referring to FIG. 1 herein, there is illustrated schematically communications between items of apparatus for covert monitoring of communications calls, particularly but not exclusively voice telephone calls, according to a first specific embodiment and method.

Person to person voice calls between first and second handsets 100, 101 respectively can be covertly monitored by one or more monitoring devices 102, 103, without interruption of the voice call, and without either of the parties of the voice call being aware that the voice call is being monitored.

First handset 100 may be configured to be subject to being monitored when it communicates with one or more pre-determined telephone numbers. In use, when a call is received from one of those pre-determined telephone numbers, the system is configured such that the call is monitored by first monitoring device 102 which in this case is another mobile telephone handset and/or recorded by a second monitoring device 103, which may be a data Jogger or voice recorder, for example in the form of a modified server computer.

The data monitoring devices may be capable of storing audio or voice data, or other communications data such as e-mails, messages, pictures or the like, together with other details, such as start and finish times of a call, and the telephone number of one or more parties to the call.

A typical communications handling process may be as follows. First person A on a first mobile handset 100 receives a call from person B on a second mobile handset (of course, B need not be making the call with a mobile handset but may be making the call with any type of handset). The communications call is automatically replicated to a second monitoring device 103 where a third person, C may monitor in real time the communications call. That is, the communications call is conference to the third person C, but without first or second persons A, B knowing that the call is being conferenced. The monitoring device operated by third person C may have a record facility, so that the person may record the content of the communications call, for example a voice conversation.

The system may be configured such that at all stages, for each and every pall, either incoming or outgoing, from the monitored device of first person A, this is conferenced to a monitoring device, which may be operated by third person C.

The monitoring person C, through the monitoring device, has a wide range of flexibility to predetermine whether they wish to be conferenced, and whether they wish the communications call to be recorded and stored. For example, predetermined rules may be set at the controller, by a person using a monitoring device to, for example specify that all further communications concerning a particular monitored device are routed or conferenced to a recording device, rather than a mobile handset device. This avoids the monitoring person getting a phone call alerting him that a monitored device is making or receiving a communication every time that happens, but on the other hand, the person can then, at their leisure check up on communications over a particular period, not necessarily at the same time that the call is being made on the monitored device. In other words, a monitoring person may specify that all calls are conferenced to a hard drive recording device instead of their own mobile handset until further notice.

In general, the system may be set up such that any operation of the monitored device may be reported to a predetermined monitoring device, and a user having control of configuration of the system may set up rules which specify I o which types of data concerning the monitored device are monitored, how they are monitored, at which times they are monitored and to which monitoring devices the data is reported to.

Not only can the conferencing of incoming/outgoing communications 15 concerning the first monitored device used by person A done automatically, but it may also be done covertly, that is without the user of A of the first monitoring device, or the user B of the second device, knowing that the call is being conferenced.

Neither the first user A of the monitored device, nor the second person B in communication with the monitored device will know that their communications device and communications are being monitored by a third party C, using a monitoring device.

Any changes to data input to a monitored device, or changes to a set up of a monitored device may be relayed to a monitoring device for recordal or real time monitoring.

For example, a person may take a picture on a mobile picture phone having a camera and a picture image may be stored in the memory of the monitored device, without actually sending the picture to a called party. Alternatively, a user of a monitored device may capture an image, either still or moving, and immediately delete it, without committing it to permanent memory within the device. Such images may automatically be reported to the monitoring device, even though they have not been stored locally at the monitored device, or sent to a third party. Further, control of the mobile device may extend to configuring the device to periodically or at pre-set times, or upon receipt of a signal from the controller to capture images using the devices image capture device, e.g. camera and automatically report those to the monitoring device, covertly, without the knowledge of the monitored device. Further, the monitored device may be configured to take a picture or capture an image, either moving or still when pre-determined types of operation, interactive or communication are experienced by the monitored device. Additionally, or alternatively, the monitored device may be operable to capture an image in response to other cues which may include light particular light levels or variations in light levels or particular inclinations of the device or variations in inclination of the device. For example, capture of an image or sequence of images may be configured to occur whenever an outgoing call is initiated, whenever an incoming call is received, or in response to other predetermined trigger events, being operations of the monitored device. In the general case, the controller may be capable of seizing controls of pre-defined operations or functions of the monitored device, covertly, in addition to any monitoring functionality which the controller may exercise over the monitored device. Similarly, a user of a monitored device may key in a text message into the device, but not actually send that text message. In each case, whenever the monitored device receives the communication (whether that communication is sent to a further called device or not), there may be automatically activated replication of that communication to a predetermined monitoring device.

Any changes to the set up of a monitored device, for example changes to the name or address database in a mobile phone, may trigger replication of those configuration settings of the monitored device to be replicated or sent to a monitoring device. Further, the system may provide deniability and/or reputability that communications are being monitored, that is, a person monitoring a monitored communications device may be able to deny, upon investigation by a user of a monitored device, or by third parties, that a particular person's communications device is being monitored. In cases where control of the monitoring functionality is kept under control of the monitoring person, it may be technically infeasible for a user of a communications device to be able to find out that their calls are being monitored.

Within the monitoring system, there is provided a facility for pre-determining periods when a device may be monitored. For example a managing director or chief executive of an organization subscribing to or having control of the system for monitoring one or more monitored communications devices may decide that a monitored device such as a mobile telephone handset issued to a particular sales person in the workforce should be monitored at particular times of the day, for example to coincide the opening hours of a particular stock exchange or bourse, or for any other reason.

Further, a user having access to control of the system may specify that particular telephone numbers, or communications call destinations which a monitor device communicates with are monitored. For example a user having access to control of the system may specify that for a particular monitored device, any communications directed to a. particular destination device are always conferenced and/or recorded, whilst perhaps leaving the remainder of the communications from the monitored device or unrecorded. This is not to say that once an unmonitored call is in progress, a person in control may request that it be conferenced, monitored or recorded either directly from that moment or in respect of all future calls to that number or device. A person having access to control of the system may have a large degree of freedom in setting a set of rules for monitoring a particular monitored device, and the user of the monitored device remains completely unaware of the rules, or of the fact that the communications are being monitored in accordance with those rules.

In various embodiments, whenever data is entered into the monitored device, for example a picture is taken, or a text message is entered, the data is communicated to the monitoring device, even if that data is subsequently deleted from the monitored device, or is never actually sent as a communications call to another device.

Further, any reconfiguration or set up of the monitored device, such as adding in a new name or address, telephone number or e-mail number into a directory of the device, results in data describing that change of configuration being sent to a monitoring device, at the option of a person controlling the monitoring device, who may, at their own volition, set up the controller entity to replicate such configuration data to a specified monitoring device.

Further, any data stored on a monitored device, such as a voice memo (whether stored in an internal memory or in a removable data card), may automatically be re-directed to a monitoring device covertly and without the knowledge of the user of the monitored device.

Types of communication which may be monitored include: voice calls, SMS or text messages, MMS messages, EMS messages, diary entries, picture, video, emails, ring tones, push messages, Bluetooth or any type of data input to a monitored device, particularly but not exclusively a mobile wireless device.

Push messages consist of messages which are sent to a mobile wireless device, but instead of being received as a text which has to be accessed via a menu on the mobile wireless device in order to be viewed on the devices screen, the push message is "pushed" into view on the screen, without any interaction or operation being required from the user of the mobile handset. Push messages when received by a device are automatically displayed on the display screen on that device.

Multimedia message service (MMS) is a type of messaging service within mobile networks which extends the short message service (SMS) and acts as an upgrade from SMS. MMS messages can be seen as "slide shows" where each slide consists of a text, a picture, and an audio object. To support MSM, a device needs to have an MMS user agent as defined by the 3GPP and the WAP (Wireless access protocol) forum.

Enhanced message service (EMS) is an upgrade of SMS proposed by Ericsson Alcatel, Siemens and Motorola. EMS allows graphics, images, ring tones etc and provides an evolutionary step between SMS and MSS.

The monitored device could be a personal digital assistant (PDA), a laptop computer, a television or the like. The monitored device is preferably, but not essentially a portable device or a mobile device.

In other embodiments, the monitored device could consist of a PTT (push to o talk) enabled device.

The data input into the monitored device could include voice memos, text memos, calendar dates, meetings, diary dates or any other information stored on the monitored device. 5

Figure 2:
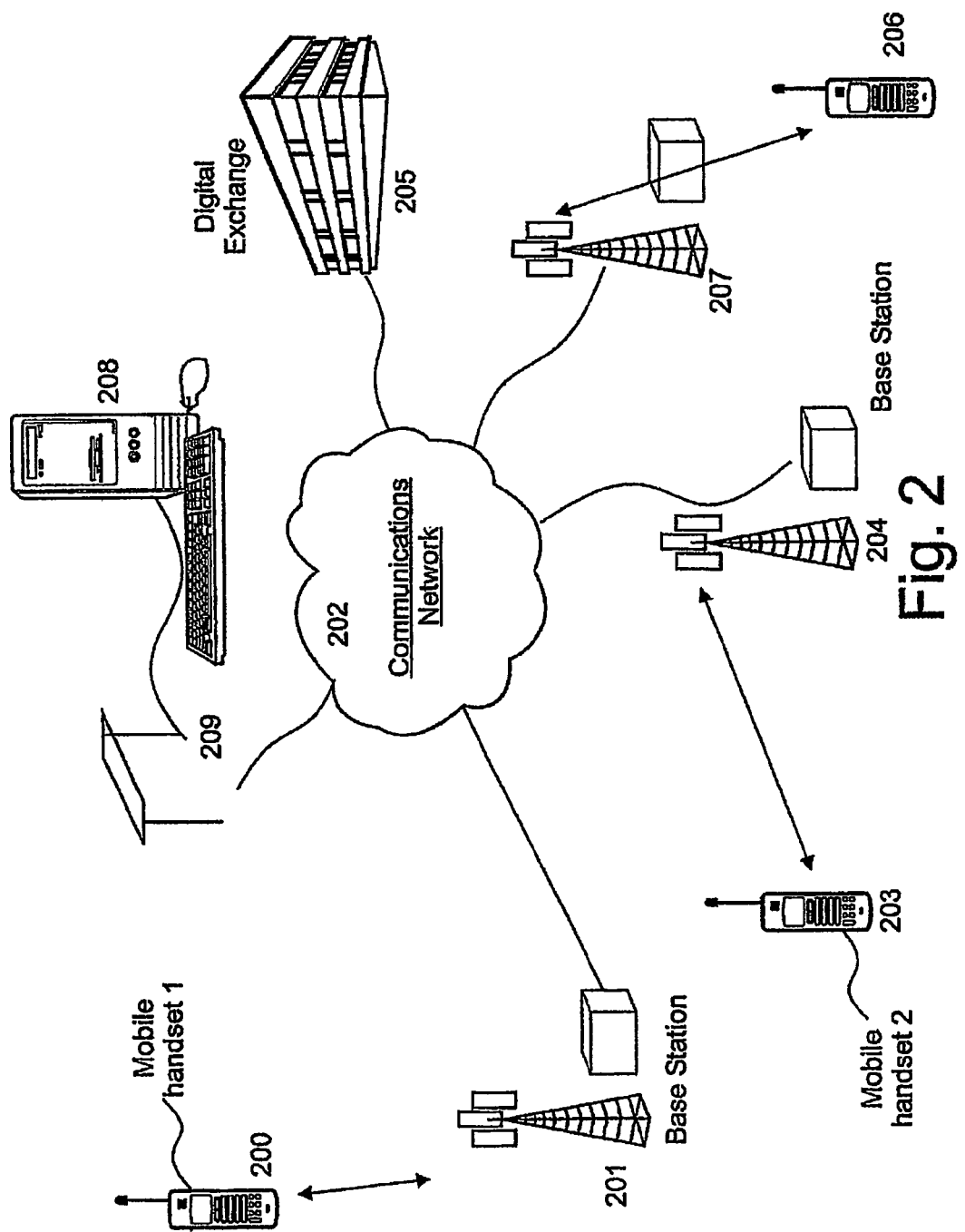
FIG. 2 illustrates schematically one specific embodiment of the monitoring system for monitoring communications calls of FIG. 1 herein.

Referring to FIG. 2 herein, there is illustrated schematically components of a communications system incorporating a covert monitoring functionality for implementing the embodiment and methods of FIG. 1. The system comprises a communications network 200, for example a public service telephone network o (PSTN) or a mobile wireless network for example a GSM network or the like.

A first party is provided with a first communications device, for example a mobile handset 200 which communicates with a first wireless base station 201. The first wireless base station 201 communicates over communications network 5 202 with a second communications device 203 of a second party, via a second wireless base station 204. The call may be routed between the first and second communications devices 200, 203 respectively via a digital exchange 205.

At the digital exchange, when the call is dialed, which can be either an o outgoing call or an incoming call from the monitored communications device 200, the digital exchange automatically dials the number of a monitoring device 206, 208.

The monitoring device can take a variety of forms. For example, the monitoring device could comprise a mobile telephone handset, in which case the content of the voice channels between both the first and second parties may be monitored audibly by a user of the mobile handset. The mobile handset may be connected to the communications network via a third base station 207.

Alternatively and/or additionally, the call may be monitored by a recording device, such as a data logger having a hard disc drive or a solid state data storage device, configured to record the entire call including the voice channels between both parties. The recording device may comprise for example a server computer, connected to the exchange via a PSTN 209.

The communications network 202 may comprise an emergency broadcast system (EBS), and/or an emergency alert system (EAS), as are known in the art.

Figure 3:
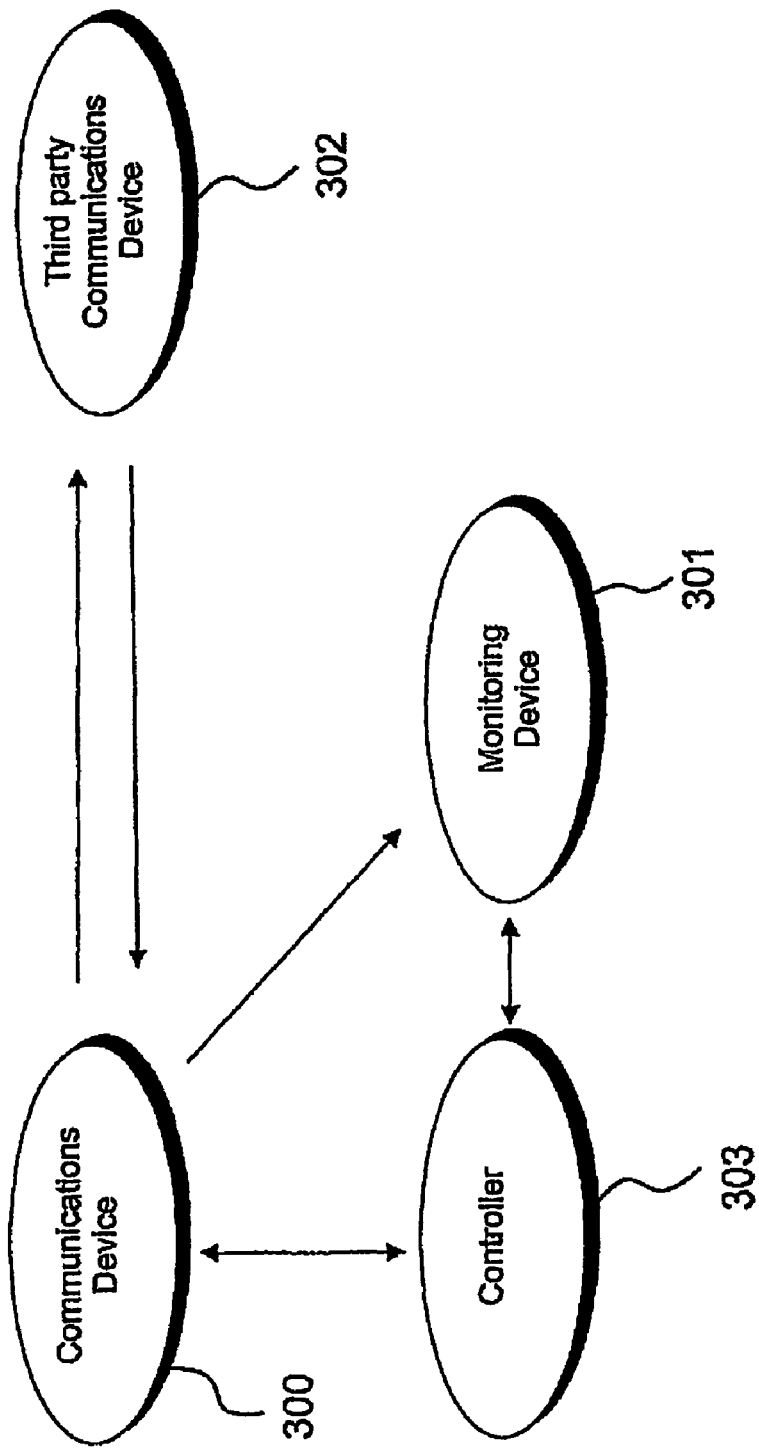
FIG. 3 illustrates schematically logical entities comprising the monitoring system of FIGS. 1 and 2.

Referring to FIG. 3 herein, there is illustrated schematically in more general terms, the communications system, described as a set of logical entities. The logical entities comprise a monitored communications device 300 which is configured to be monitored, a monitoring device 301 configured to monitor the communications device when communicating with an external third party communications device 302; and a controller entity 303. The communications device may communicate with one or more other third party communications devices, consisting of for example conventional mobile phones or conventional telephone handsets.

Operation of the monitoring device for monitoring the communications device 300 is controlled by the controller entity 303.

The controller functionality in the general case can be provided anywhere within the system. For example, the controller may be provided as a software module incorporated into a central switch, or a wireless base station and/or a network management console.

Alternatively, the controller entity 303 may be provided as a program stored on a SIM (subscriber identity module) card. SIM cards are known in the art as a small printed circuit board which is to be inserted into any GSM based mobile phone when signing on as a subscriber. The SIM card also stores data which identifies the caller to a network service provider. Where the controller is provided as a SIM card, and the monitored device is a mobile phone handset, then the monitored phone handset may be interchangeable with other handsets.

Installation of the SIM card into the mobile phone handset may convert a conventional mobile handset into a monitored device.

In alternative embodiments, the controller may be provided as dedicated software within a mobile phone handset, which can be remotely reconfigured from a monitoring device. In the general case, the controller entity may be resident either at a single location within a network or distributed across a plurality of locations within a communications networks.

Figure 4:
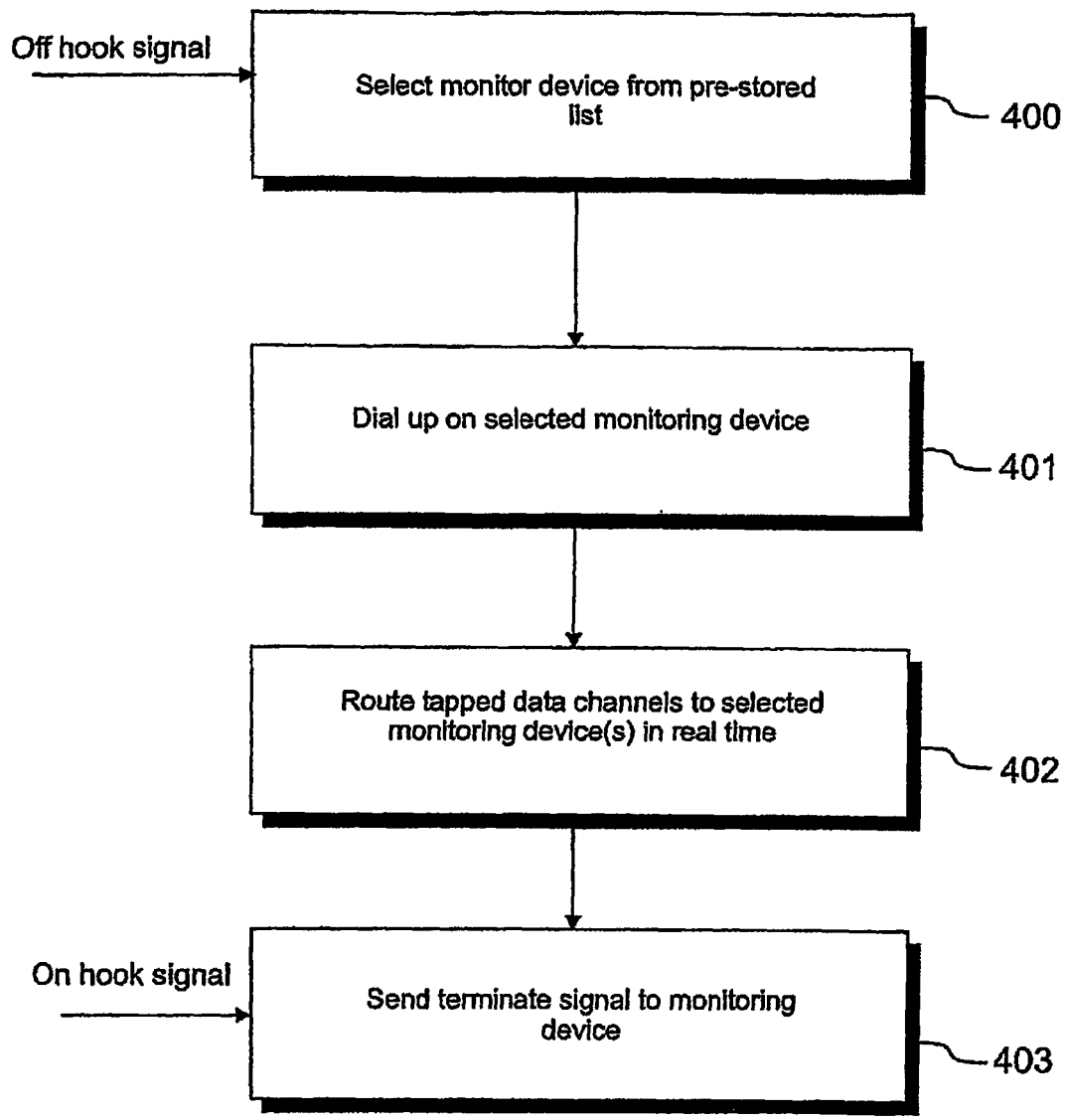
FIG. 4 illustrates schematically a mode of operation of a controller entity described in FIG. 3.

Referring to FIG. 4 herein, there is illustrated schematically one example of process steps earned out at the controller entity 303 for activating monitoring of a communications call in the first embodiment of FIGS. 1 and 2. When the monitored communications device 300 either activates a call, or received an incoming call, the user of the communications device opens a communications channel by setting the device to an "off hook" condition. For example in the case of a mobile phone handset, this consists of pressing a key button on the mobile handset device to receive a call, or in the case of dialing a call, activating the "off hook" key pad device and then dialing a number. The "off hook" signal is received at a mobile telephone base station.

The controller entity 303 may be resident at a switch, either at a telephone exchange of a PSTN or connected to a mobile phone base station or elsewhere in a communications network. Upon receiving the "off hook" signal, the controller device selects one or more monitoring devices from a pre stored list of monitoring devices which may be specific to the monitored device, and pre-registered at the controller. The pre-stored list includes the data identifying the monitoring device(s), for example a telephone number of the monitoring device(s). In process 401, the selected one or more monitoring devices are dialed up by the controller, to connect the telecommunications switch controlling the call between the monitored communications device and a third party, and the one or more monitoring devices (206, 208, 301), with the result that the data content of the communication between the monitored communications device (200, 300) and the third party communications device (203, 302) is tapped and can be monitored by the monitoring device(s) in real time in process 402.

By "tapped", it is meant that the data, being transmitted and received in the communications channel between the monitored communications device and the third party communications device is replicated, without affecting operation of the monitored or third party communications devices. That is to say, data is copied as a separate set of signals, which are then transmitted along the communications channel between the switch and the one or more monitoring devices.

When the monitored communication device, or the third party communications device terminates the call by terminating the communication channel, an "on hook" signal is received by the switch and which is also received by the controller device from the switch. Upon receiving the "on hook" signal, the controller device terminates the channel between this switch and the one or more monitoring devices in process 403.

Figure 5:
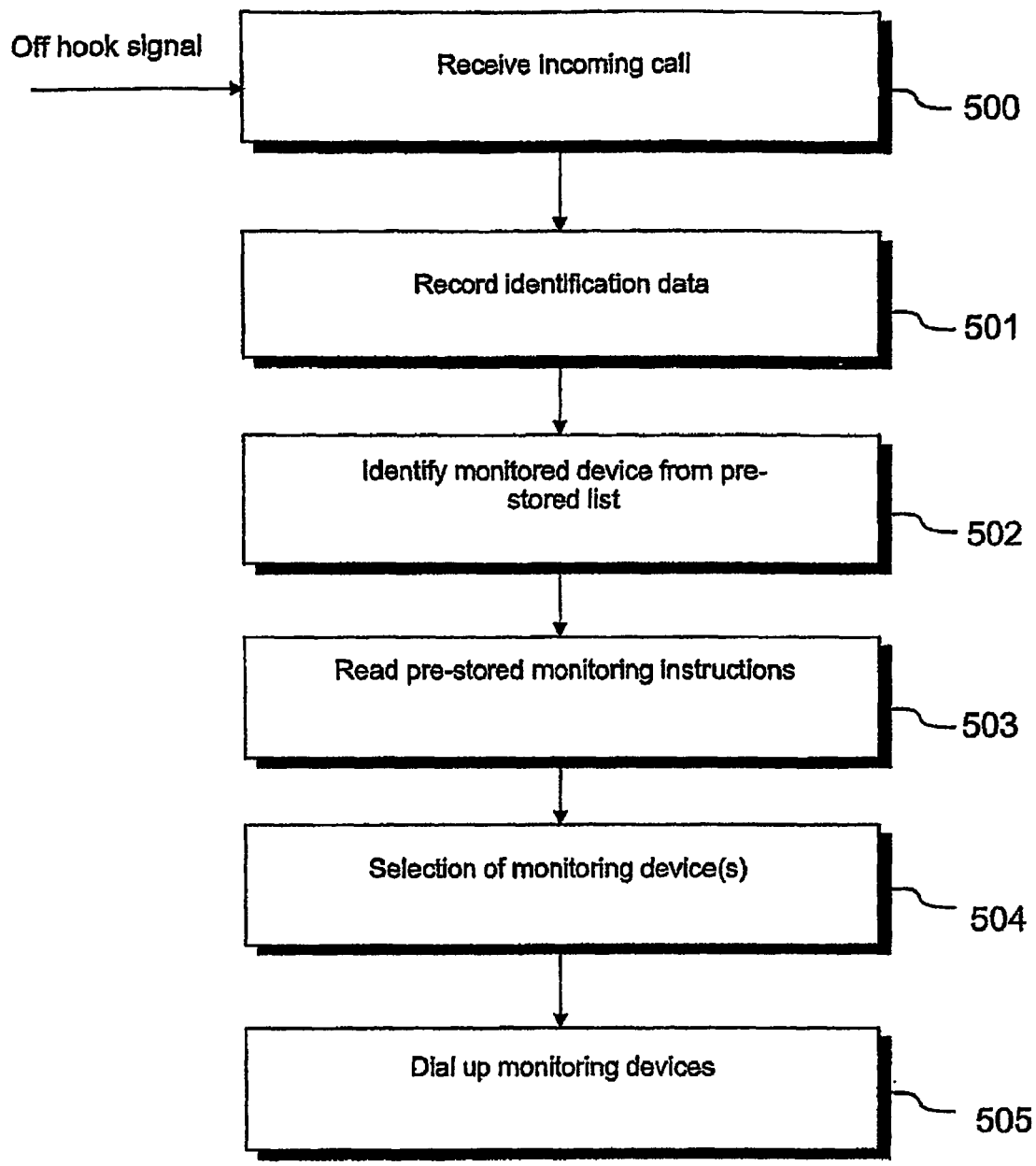
FIG. 5 illustrates schematically a second mode of operation of the controller entity described in FIG. 3.

Referring to FIG. 5 herein, there is illustrated schematically a second mode of operation of the controller entity 303. In process 500 upon receipt of an "off hook" signal from a switch, the controller device receives details of an incoming call. In process 501, the controller device records an identification data of the communications device which is being monitored. In process 502, the controller identifies a monitoring device from a pre-stored list of monitoring devices corresponding to the pre-registered monitored device. Resident at the controller device, may be a pre-stored data base consisting of a set of pre-determined monitoring instructions for each of a plurality of pre-registered monitored devices. These may be user definable by a user of a monitoring service. For example, the pre-stored monitoring instructions may be "immediately dial mobile phone number xxxxx yyyyy zzzzz" and route the communication to that mobile. Alternatively, the pre-stored instruction may consist of dialing up a person's mobile phone for real time monitoring of the call, and recording the call on a recording device, which would involve routing the call to two separate monitoring devices, that is, the persons mobile phone so that they can listen to the communications call in real time, and to a recording device for recording the telephone call in real time. The pre-stored instructions are accessed in process 503.

Particular monitoring devices for monitoring a pre-determining monitored communications device may be pre-registered with the controller and stored in a data base. For example, the telephone number of a mobile phone device used to monitor a call for another (monitored) mobile phone device may be recorded in a data base at the controller device. Similarly, the phone number or internet address of a recording device may be pre-stored for monitoring a particular identified monitored communications device. This information is stored in a data base at the controller.

In process 504, once a monitored communications device has been identified, a data entry for that communications device is read from a look up table, and the appropriate monitoring device recorded for that monitored communications device are contacted by the controller. For example this may involve ringing up the mobile phone (monitoring device) of a person and dialing up a recording device, identified by its phone number, in process 505.

Figure 6:
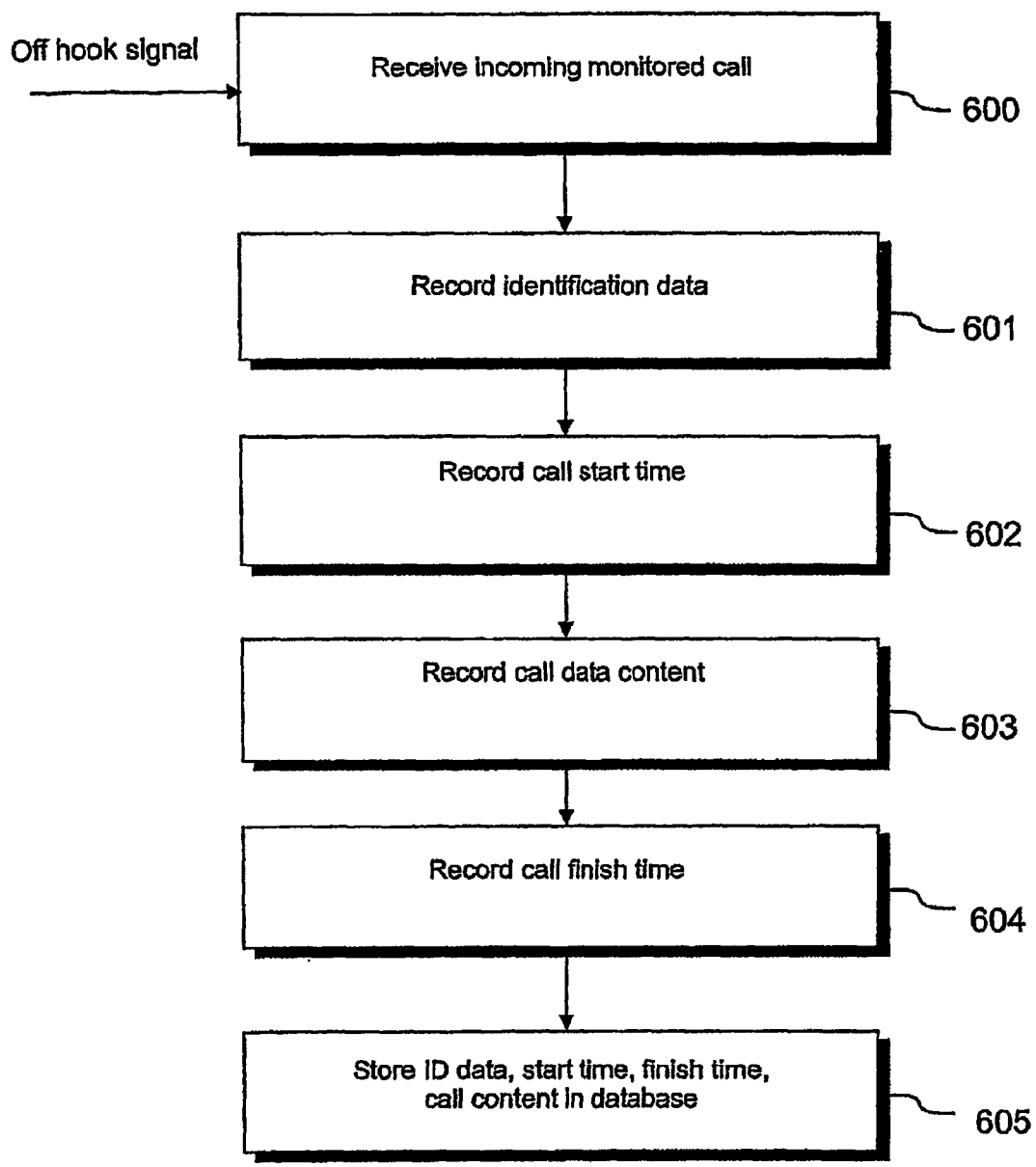
FIG. 6 illustrates schematically a first mode of operation of a recording entity illustrated with reference to FIG. 3.

Referring to FIG. 6 herein, there are illustrated schematically one example of process steps which are carried out at a monitoring device (208, 301) for recording of call data. Once the monitoring device has been selected by the controller, the controller opens up a communication channel to the monitoring device. In one example, this may involve the controller sending an "off hook" signal to the selected monitoring device, after first dialing up that monitoring device. The selected monitoring device receives the incoming call in process 500. The content of the incoming call comprises data flowing in a direction sent from the monitored device to the third party device and/or data sent from the third device to the monitored device. In the case of a mobile telephone call, since there is two way voice traffic, the content of the monitored call would be voice data from the monitored device to the third party device, in addition to any voice data transmitted from the third party device to the monitored device. In the case of a text message, the data may comprise text message data sent in one direction, either from the monitored device to the third party device, or from the third party device to the monitored device. Similarly, in the case of a picture data (still image data or video data), the data may comprise one way data traffic either from the monitored device to the third party device, or vice versa, from the third party device to the monitored device.

In process 601 identification data is recorded to identify the monitored device. Optionally, where available, the identification data may also comprise data identifying the third party device, for example the telephone number of the third party device.

In process 602, the recording device records the start time of the communication between the monitored communication device and the third party device. In process 603, the recording device proceeds to record the data content of the communication between the monitored device and the third party device in full.

In process 604, when an "on hook" signal is received, or alternatively a signal from the controller indicating that the communication between the monitored device and the third party device has terminated, the recording device records a finish time of the communication.

In process 605 the identification data, start time data, finish time data, and call content are stored in a database resident on a physical data storage device. Storage of the different data types in process 606 may carry out in parallel to processes 601 to 604 as data is received in real time.

Referring to FIG. 7 herein, there is illustrated schematically examples of data types which may be collected in a data base at the recording device. The recording device may collect data comprising:

A device identifier data 700, consisting of a unique identification data 701, for example a device number, for identifying a particular device; data 702 identifying an individual human person associated with the monitored communications device; and a telephone number 703 of the communications device.

Data describing a third party communications device 704, for example a third party telephone number; a start time and date data 705 of a communications call; a finish time and date data 706 of a communications call between the monitored communications device and a third party communication device; data 707 describing whether the communications call was made by the monitored communications device, i.e. an outgoing call, or whether the call was initiated by a third party device (i.e. an incoming call); and, the recorded content data 708, being the content of the communications call.

The content data may comprise various data types, for example voice data (audio data), which may be stored in the form of a .wav file, an MP3 file or the like; SMS message data, still or video picture data, for example stored as a MPEG file, or a J Peg file, or a TIFF file or a PDF file or any other file format.

Figure 8:
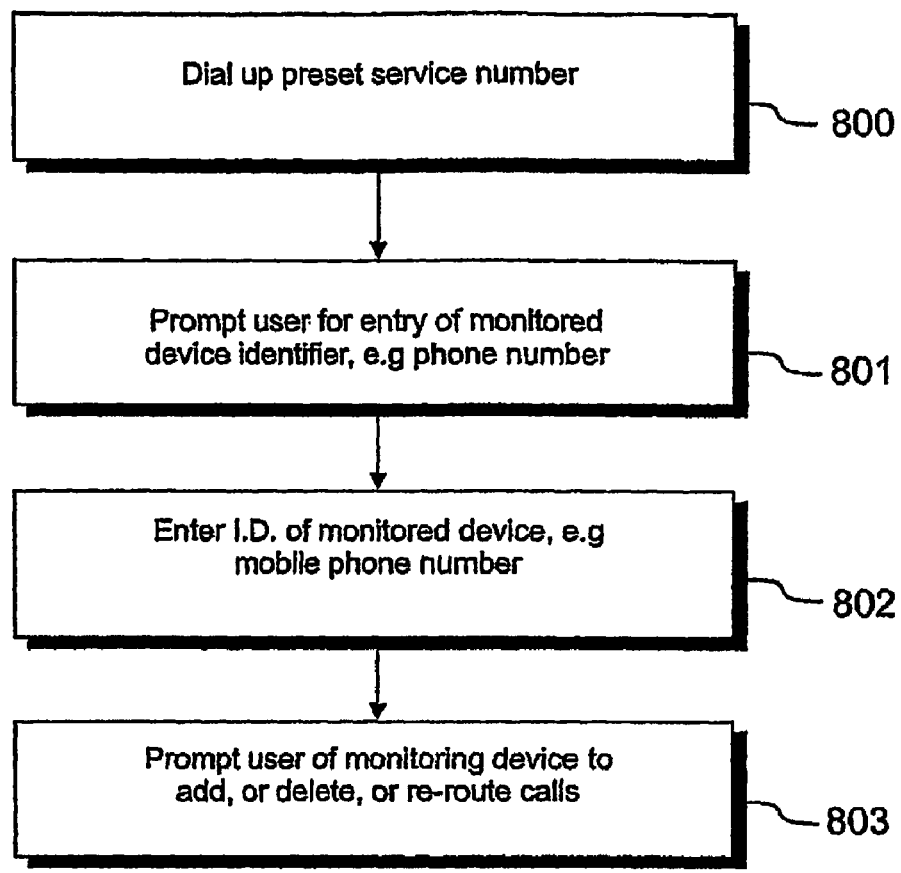
FIG. 8 illustrates schematically processes carried out by the first monitoring device for setting or re-setting the device to monitor a monitored device.

Referring to FIG. 8 herein, there is illustrated schematically an example of process steps carried out at a monitoring device to configure the system. A user of the first monitoring device 102 may configure the monitored device 100 to delete or add to the list of numbers or other identification data stored in relation to monitored device 100, and corresponding to a third party communications device 101. For example, to add or change a number or identification of a third party communications device 101 for which calls between that device and the monitored device will be monitored, a user of first monitoring device 102 may dial up a preset service number in step 800. This connects the user of the first monitoring device with controller 303. The controller 303 may prompt the user of the first monitoring device 102, either by a voice message, text message or picture message to enter the telephone number or other identification of the first monitoring device 100 to be monitored in process 801. The user of the first monitoring device enters the telephone number or other identification of the monitored device 100 in step 802. This identifies which device is to be monitored. For example, this could be the mobile phone number of the device to be monitored. In process 803, the controller prompts the user of the monitoring device to add, delete or re-route calls, or to change the preset instructions for monitoring of calls conducted by the monitored device 100.

Figure 9:
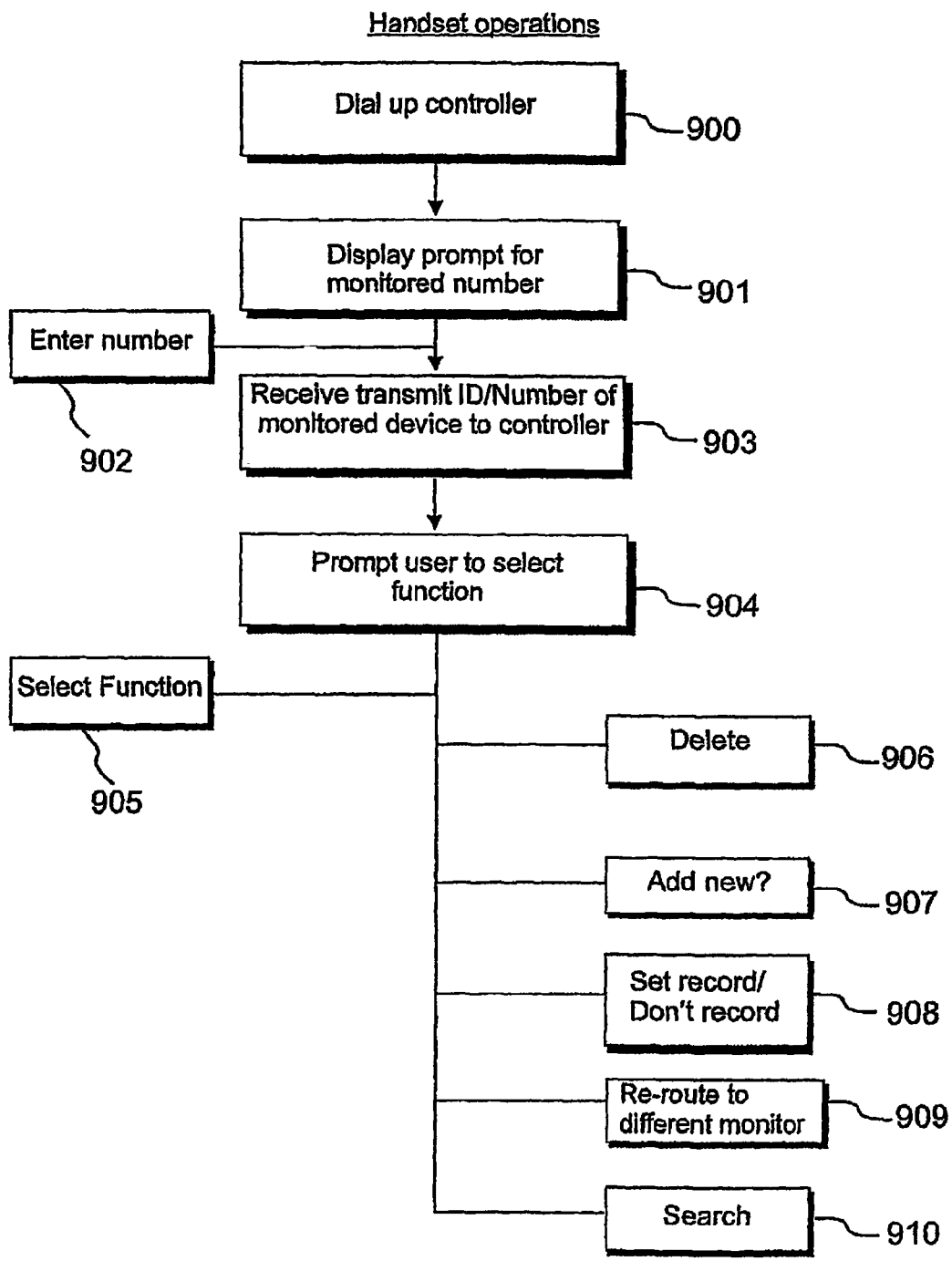
FIG. 9 illustrates schematically display functions and data entry functions earned out at the first monitoring device for monitoring a monitored device.

Referring to FIG. 9 herein, there are illustrated schematically operations 25 carried out at the first monitoring device 102, 206, 301, which may be a mobile phone handset, for changing the monitoring criteria for a monitored device. A user dials up the controller device in process 900. The user may select the telephone number of the controller device from a preset list. Directories of pre stored numbers on mobile telephone devices are known in the art. In process 900, the first monitoring device may provide a visual display of a selection of numbers which are currently entered in the directory of the monitored device, each of which relates to a separate monitored device. The first monitoring device may monitor more than one monitored device, in process 902, the user may select a number of a monitored device from the pre-determined list, and enters that number by pressing a key on the handset. In process 903 the monitoring device receives the user input and transmits the identification (which may be a telephone number) of the monitored device to the controller device. In process 904, the monitoring device 102 prompts the user to select a function from a pre-stored menu, for example menu items may include: a menu 906 for deletion of a monitor device; a menu 907 for addition of a new monitored device; a menu 908 for whether to record or not to record the data content of a call for a monitored device; a menu 909 for whether to re-route or copy a calf to a different monitoring device; or a search menu 910 each option being presented as a separate menu.

Figure 10:
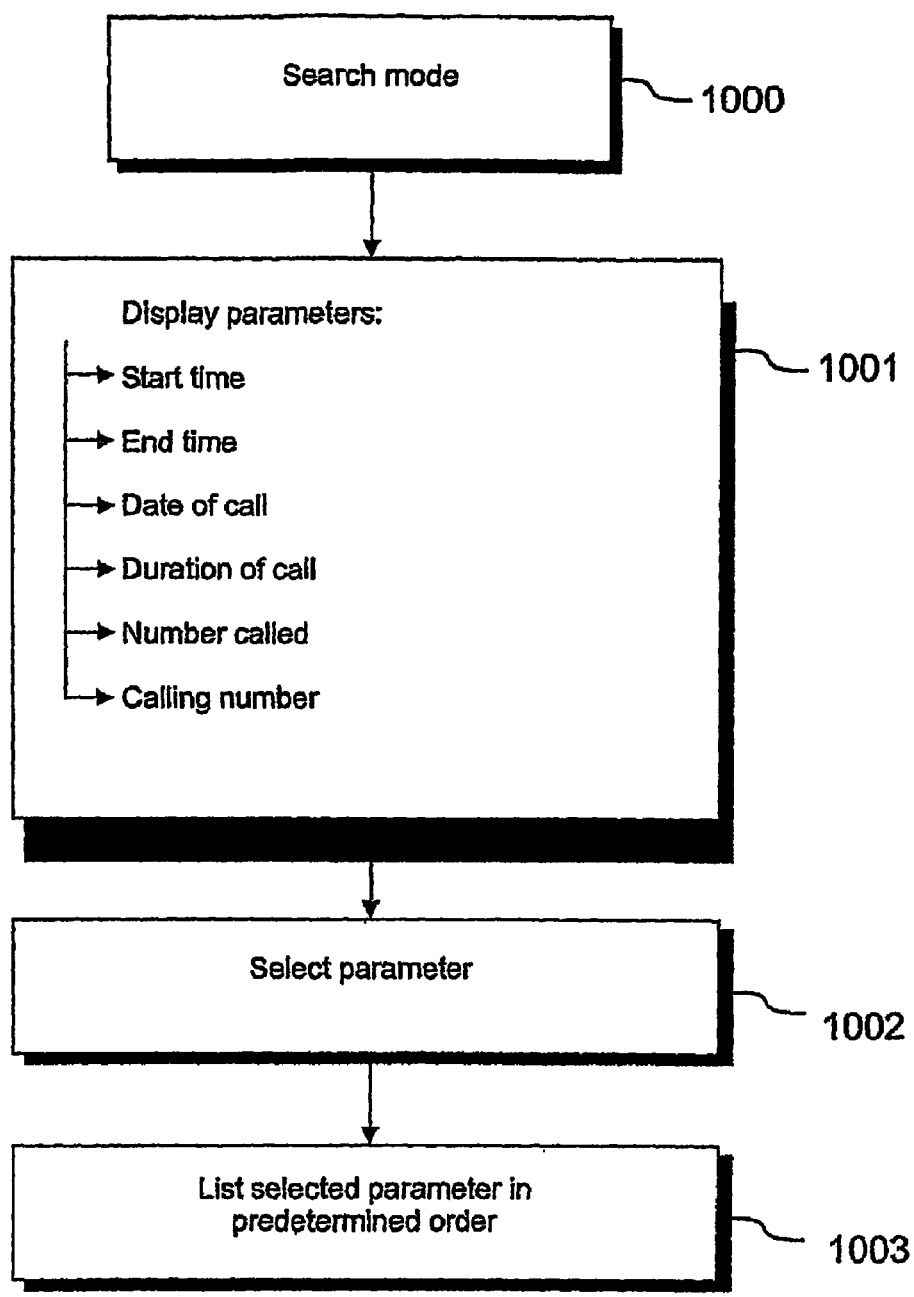
FIG. 10 illustrates schematically processes carried out by a monitoring device for searching and retrieving data recorded from monitored calls.

Referring to FIG. 10 herein, there is illustrated schematically processes carried out at a monitoring device for searching recorded data describing calls that have been monitored. A search mode may be initiated using a menu driven interface on the monitoring device, for example as described with reference to FIG. 9 herein before. In process 1000, a user initiates the search mode using a menu driven process at a monitoring device, for example a mobile phone handset. In process 1001, a display device of the monitoring device lists a selection of menu items including: call start time; call end time; date of a call; duration of a call; a number called; and a calling number.

Using a key pad interface, a user may select a parameter by scrolling the list of displayed parameters in process 1002. In process 1003, the monitoring device may list the selected parameters in a pre-determined order.

Parameters may be displayed in pre-determined order depending upon the parameter as follows.

In the case of start time, calls may be listed in order of start time and date. The calls may be listed with either the most recent calls being listed first, and being displayed in the order most recent to oldest, or alternatively may be display in the order oldest call first and ordered as oldest to most recent. In the case of call end time, calls may be listed in time and date order in either most recent first, or oldest first.

In the case of the parameter of call duration, calls may be listed in the order of calls having the highest duration first, or alternatively in the order of calls having the least duration presented first.

In the case of number called, number called may be listed in date/time order with most recent first, or oldest first, or alternatively, called numbers may be listed in numerical order of telephone number.

In the case of parameter of calling number, numbers which have called the monitored device may be listed in order of either the most recent calling device first, or the oldest call is listed first. Alternatively, calling numbers may be listed in numerical order of telephone number.

It will be appreciated that the start times, finish times, may also be recorded for other data input into the monitored device but not necessarily sent as a call, and even for data input to a monitored device which is later deleted from the device without being transmitted from the monitored device to a called party. Similarly for data concerning changes to the set up or configuration of a monitored device made by a user of that monitored device.

Specific embodiments and methods described herein may provide an apparatus and method to enable corporate managers, company directors, sales directors and the like to covertly monitor telephone calls and other communications conducted on telecommunications equipment owned by or leased to the corporation, for the purpose of monitoring employees, and co-workers covertly. The specific embodiments may find many applications, however the following applications are anticipated as being the most commercially important.

By using a first monitoring device in the form of a mobile phone, and a second monitoring device in the form of a data logger or recording device, calls may be listened to, viewed or accessed in real time by a user, as well as at the same time recording the data content of the call.

Selective "zapping" of a monitored communications device.

Figure 11:
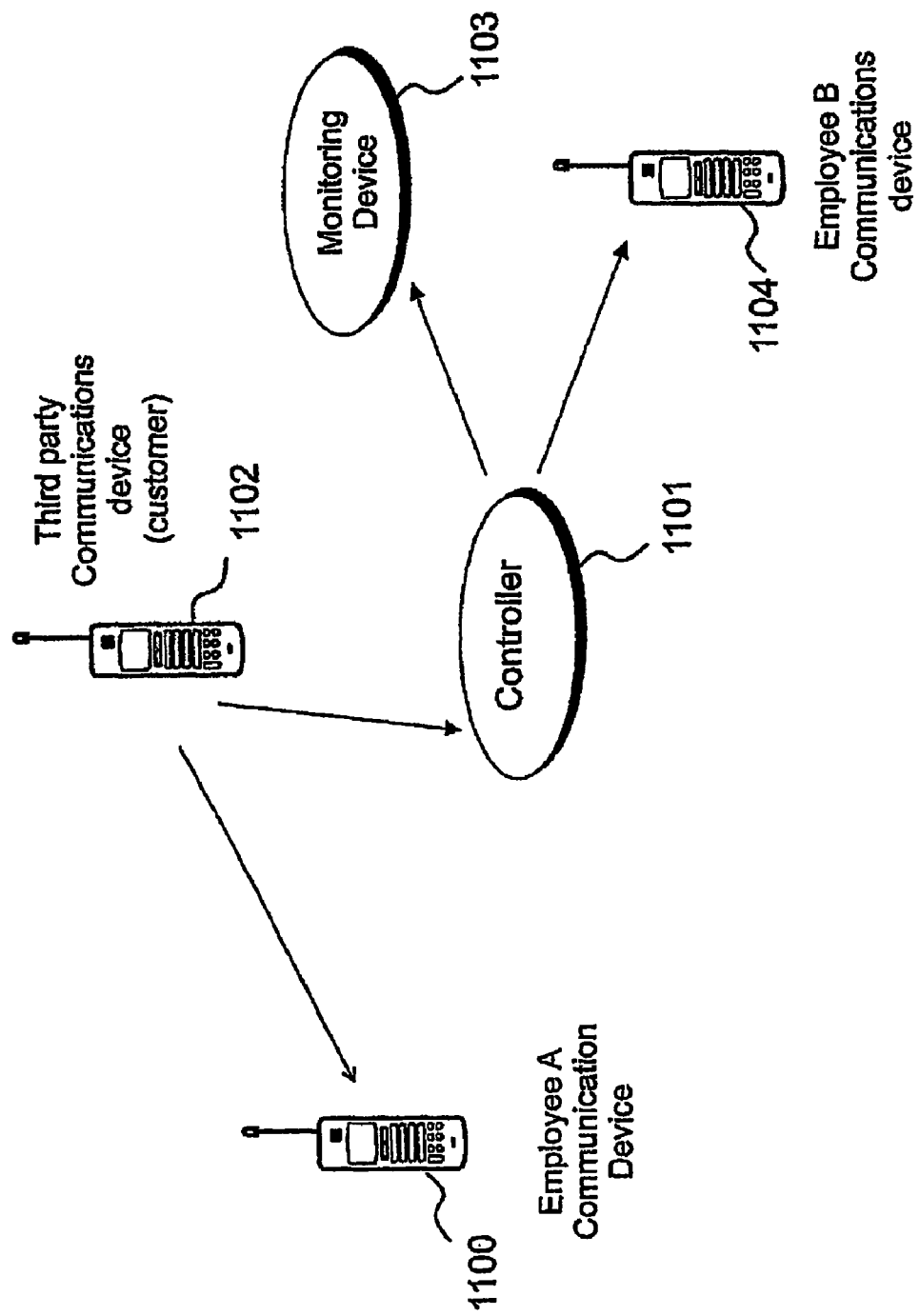
FIG. 11 illustrates schematically operation of a selective "zapping" function of the communications system and communications device according to a specific method herein.

Referring to FIG. 11 herein, there is illustrated schematically a further mode of operation of a monitored communications device and communications system, for selectively "zapping" a monitored communications device 1100 from a controller device 1101. This involves control over the communications device to disable or enable some of its functionality, where the control may be exercised via the controller device.

In some situations, it is desirable for a subscriber to a monitoring service enabled by the methods and apparatus disclosed herein, for example typically an employer, to selectively disable or control a mobile wireless device, for example a mobile phone of an employee. By selective control, it is meant that only selected features of the device are controlled, for example disabled, and/or selected communications or operations of the device are controlled. A typical usage scenario may be as follows.

Suppose a staff member's employment has been terminated, or a person has handed in their notice to terminate employment with an organization and is working through their notice period. That person may still communicate with important customers or clients of the employer organization. However, it is clear to the employer that the employee will soon work for a competitor of the employer, and therefore potentially for the remainder of the employees notice period until termination of employment, the employee may not have the full interests of the current employer on their mind. Rather, there is a definite risk that the employee will tell key customers that they are moving employer and 5 there is a risk that the customers may follow the employee rather than stay with the employer organization. Under these circumstances, where the employer organization subscribes to a monitoring service, the controller device 1101 may be used to re-route any incoming calls destined for the employees communications device 1100 to a monitoring device 1103, so that the employer, who is a subscriber to the service, can monitor the incoming calls destined for the employees communications device 1100, and effectively block the employees communications device from receiving specified incoming communications, for example from important clients.

As a further option, the employer, using controller 1101, or via a network operator using controller 1101 may divert all calls intended for the employee's communications device 1100 to a new employee's communications device 1104, so that the replacement employee (employee B) can provide service to the customer and build up a new personal relationship with a customer in o replacement of employee A, thereby avoiding the customer following employee A to their new employer, and therefore avoiding losing the customer.

Typically, on activating a "selective zapping" service, an operator of the system, or a user of the system, using the controller may either apply the 5 zapping to all incoming or outgoing calls, or will selectively apply to divert outgoing calls only or incoming calls only to a monitoring device.

Alternatively, a user may enter the identifications of various other communications devices, for example known telephone numbers or known e-mail 0 addresses of particular companies or individuals, so that only calls between a monitored communications device and those identified communications device are affected.

A subscriber to a monitoring facility, that is a user of the system, may be provided with various functions for treatment of communications to which the service applies, including the following:

For outgoing calls:
apply an "engaged" tone at the monitored device.
apply a "number unobtainable" . . . message at the monitored device,—apply a continuous ring tone at the monitored device.
divert the call to a replacement communications device, for example one operated by a manager or fellow employee.
Send a communication to a monitoring device where it may be delayed or suppressed following either automatic assessment by a computer program or following human assessment of the content of the communication.

For incoming calls the following operations may be applied for calls destined for a monitored device from a designated caller:
Re-route the call to a replacement mobile device, for example one assigned to a different employee or a manager.
Apply a voice mail message and divert the call to voice mail.
Divert the call to a monitoring device. —Apply a pre-recorded message,
Present the call as "number unobtainable" to the incoming caller.
Place the incoming call in a call queue indefinitely.
Present a voice menu list to the incoming caller.
Send a communication to a monitoring device where it may be delayed or suppressed following either automatic assessment by a computer program or following human assessment of the content of the communication.

Figure 12:
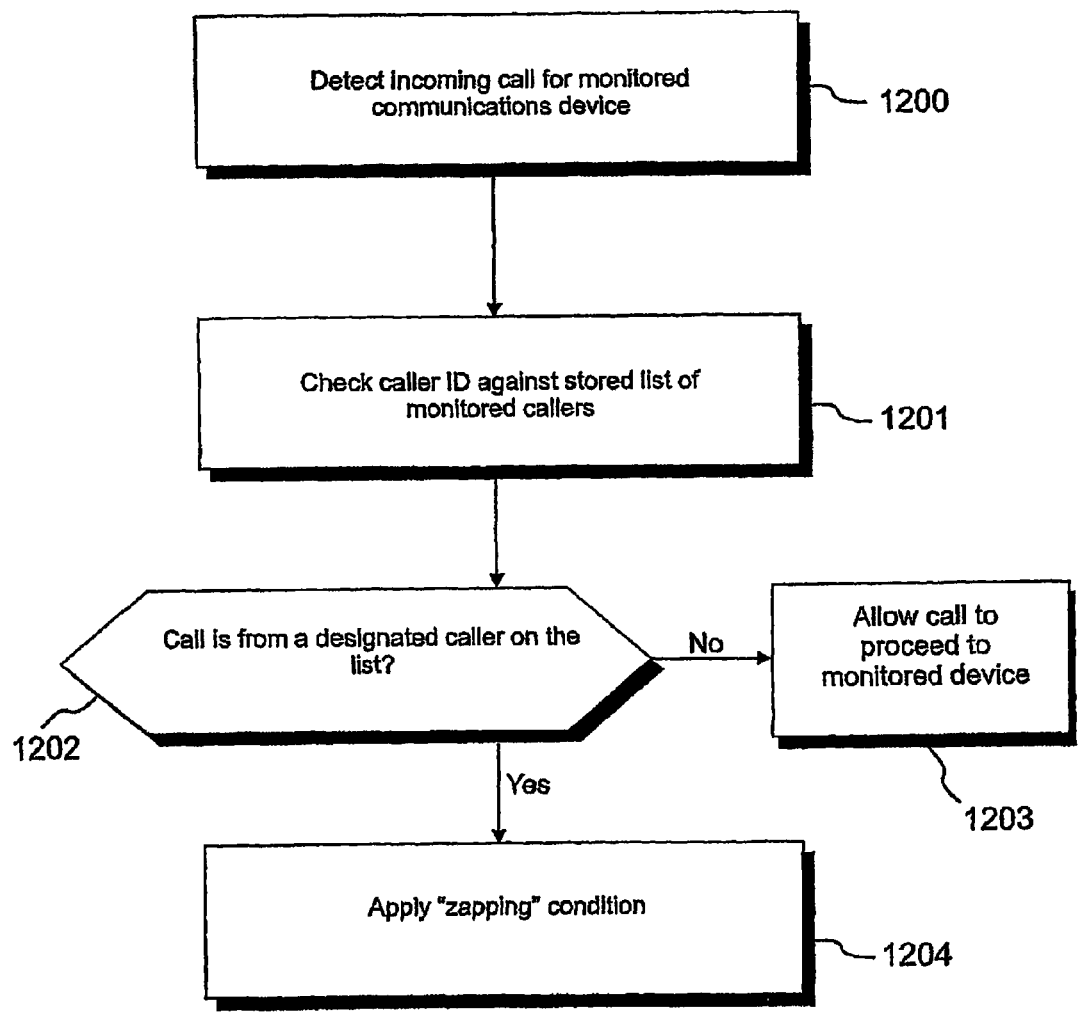
FIG. 12 illustrates schematically operation of a controller device for applying a selective zapping condition to incoming calls destined for a monitored communications device.

Referring to FIG. 12 herein, there is illustrated schematically process steps carried out at the controller for activating a "zapping" service in respect of an Incoming call destined for a monitored communications device. In process 1200, the controller detects an incoming call for the monitored device. In process 1201 the controller checks the identification of the caller against a pre-stored list of callers for which calls are to be redirected to a monitoring device and/or inhibited from being received by the monitored device. In process 1202; if the controller detects that the incoming call is from a caller not on a designated list of callers, then the call may be allowed to proceed to the monitored device in process 1203. However, if in process 1202, the controller identifies the call as being on a designated list of callers, to which a "zapping" service applies, then in process 1204, the call is treated according to the pre-stored instructions for handling such calls, as described above.

As mentioned herein above, in process 1202, the designated list of callers may be pre-entered by a user or operator of the controller device, and that list may be pre-set to apply to all incoming calls, or specified incoming calls as appropriate.

Figure 13:
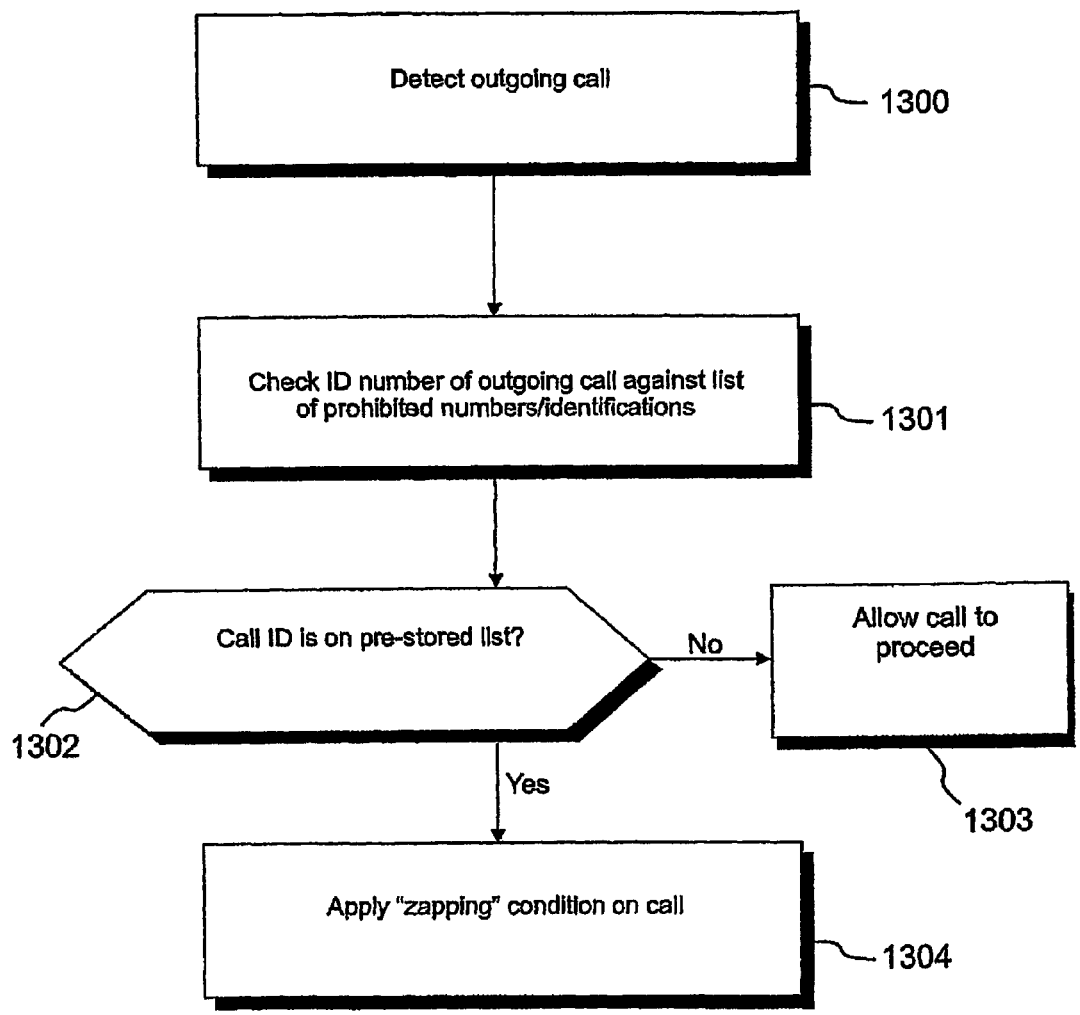
FIG. 13 illustrates schematically one mode of operation of a controller for applying a zapping condition to an outgoing call from a monitored communications device.

Referring to FIG. 13 herein, there is illustrated schematically a further operation of the controller device for applying a "zapping" condition to outgoing calls from a monitored device. In process 1300, the controller device detects an outgoing call dialed on the monitored device. In process 1301, the controller checks the identification of the called call device against a stored list of designated identifications of communications devices to which an operator of the controller has determined that the zapping service will apply. In process 1302, if the controller determines that the called device is not on the pre-determined list, then the controller allows the call to proceed in process 1303. However, if in process 1302 the controller determines that the identification of the call device to which the outgoing call applies is on the list of designated devices to which the service will apply, then in process 1304, the controller applies handling of the call according to the functions of the "zapping" service which are selected by the user, examples of which are given herein above.

Using the above facilities described with reference to FIGS. 11 to 13 herein, an operator of the controller may apply selective call treatment to calls to and from specified communications devices, leaving other calls unaffected. Therefore, for example calls to and from customers may be affected by the controller, whilst calls to and from personal friends or the like may remain unaffected. Using this facility the person using the monitored device may not immediately become aware that the device is being monitored, but rather would find that customers were always engaged or otherwise unavailable from a perspective seen from the monitored device. However, in reality those calls will be being diverted and could be handled by other members of staff, or treated in another way as specified by an operator of the controller.

An example of a policy set by an organization controlling the monitored communications device may be, for example to allow all calls incoming and outgoing from a monitored device, except any call from to or from the top 20 clients of the organization, would be diverted to a different employee. In order to effect such a policy, the employer would need to designate all known telephone numbers and communications device identifiers, for example e-mail addresses, of those top 20 clients, and store them in a database at the controller, in order for the controller to recognize those devices which belonged to the top 20 clients of the organization.

Automatic withholding and previewing of communications.

In one mode of operation the system may be configured such that incoming communications intended for the monitored device are re-routed to a monitoring device, so that a person operating the monitoring device can have time to read or review the communications and decide whether or not to allow the communication to be forwarded to the monitored device. The configuration of the monitored device may be controlled and effected by the controller device remotely, for example where the controller device is a network management console. Therefore a service of previewing and censoring the communications which the monitored device may receive can be offered to a subscriber of a monitoring service enabled by the system.

For example, if an incoming communication is received in the form of an SMS or MMS message, the controller may inhibit receipt of that message by the monitored communications device for which it is intended, and re-route the message to a monitoring device so that the message can be read by a subscriber to the monitoring service. A subscriber to the monitoring, service can then authorize the display of that SMS or MMS message or not, as the case may be, to be displayed on a display of the monitored device. Suppression and inhibition of messages in this manner may apply to any type of communication intended for the monitored device.

In a variation of the mode of operation, a communication may actually be received by the monitored device, but the monitored device may be internally configured via the controller, to inhibit any information indicating that such a communication has been received, from being displayed or exhibited by the monitored device, until the communication has been authorized by a person using the monitoring device. Therefore, for example, supposing an SMS or MMS message is received by a monitored device to which the inhibit feature has been applied, a copy of that message is sent to a monitoring device and can be censored by a user of the monitoring device. If the censor approves that message to be displayed on the monitored device, the message appears on the monitored communications device as if it had been received normally, i.e. that is, the user of the monitored device cannot tell that the message has been censored. Once the incoming communication e.g. message, is authorized to be displayed, then it may be presented using normal alerts, e.g. a tone, a vibration, or an envelope appearing on a display screen of the monitored device. Up until the message or communication is authorized, the tone, vibration, and envelope display may also be inhibited.

Similarly, outgoing communications issued from the monitored device may also be temporarily inhibited by being re-routed to a monitoring device instead of being transmitted to their intended recipients. An operator of the monitoring device may then censor those outgoing communications, and take a decision on whether the outgoing communications can be transmitted onto their intended recipient, or withheld from the intended recipient. From the perspective of the user of the monitored device, where asynchronous messages are sent, provided the delay taken in censoring those messages is not large, then the user of the monitored device may be unaware that the messages are being censored by a third party.

Usage for Emergency Broadcasts

It will be appreciated by the skilled person that the communications types described herein may include alert communications issued by governmental or military organizations for the purpose of national defense or civil defense, including communications of the EBS and/or EAS types.

Whilst specific embodiments and methods described herein have concentrated specifically on monitoring of a monitored device in which the user of the monitored device is unaware that the device is being monitored, i.e. covert operation of the monitored device, in variations of the embodiment, an operator of the controller and/or the monitoring device may be provided with an option to intervene in an operation or interaction of the monitored device. For example, call blocking, call barring facilities of a communication maybe provided, and in some embodiments a user of the monitored device may be explicitly made aware that the monitored device is being remotely controlled and/or remotely monitored.

However, as will be appreciated by the person skilled in the art, the covert monitoring facility may be of great practical and commercial usefulness to an operator of the system in the capacity of a person monitoring a monitored device.

Multiple Line Functionality

In yet a further embodiment, there is provided a covert "line 2" functionality.

It is known to have a "line 2" facility on a conventional mobile phone handset. In the known line 2 system, two or more individual lines can be incorporated on the same SIM card in a single mobile phone handset. Such facilities are available in the UK from O2™, Vodafone™ and Orange™'

Known conventional SIM card technology is capable of managing up to 10 different lines corresponding to 10 different telephone numbers or identification numbers, each identifying a different customer line, per SIM card. Typically, for lines in addition to the first line, differential pricing is applied so that the subsequent lines are each charged at a lower rate than the primary line.

Similarly, different lines on the same mobile handset can have applied different tariffs, so that the different lines are aimed at different types of usage, e.g. business, or personal usage.

Conventional multiple line facilities on a mobile phone handset operate as follows from the user's point of view. For incoming calls, no matter which line is called by an external caller, the call comes through to the same mobile phone handset on which the SIM card resides. On the visual display of the mobile phone, there is indicated which line is being used for the incoming call, for example line 1 or line 2.

For outgoing calls, the user must first select which line to use before dialing in the phone number or other identifier of the person or equipment which they wish to call, before making a call.

A feature of providing a mobile or portable wireless device to a user, having a monitoring facility as described herein, is that in order to maintain the covert nature of the monitoring, the user of the mobile wireless communications device must remain unaware that operations of, interactions with and communications of the device are being monitored. Since monitoring service may be provided by a network provider or other service provider, as a commercial service, there will need to be charges made for that service, and therefore automated call charging systems need to be modified in order to make sure that the covert nature of the monitoring is maintained, and the user of the monitored mobile wireless communications device does not become aware of the monitoring function via any billing procedure.

In the specific embodiments that follow, a multiple line facility may be used to provide separate billing to a subscriber of a monitoring service and a subscriber of a normal communications service to a wireless device.

Figure 14:
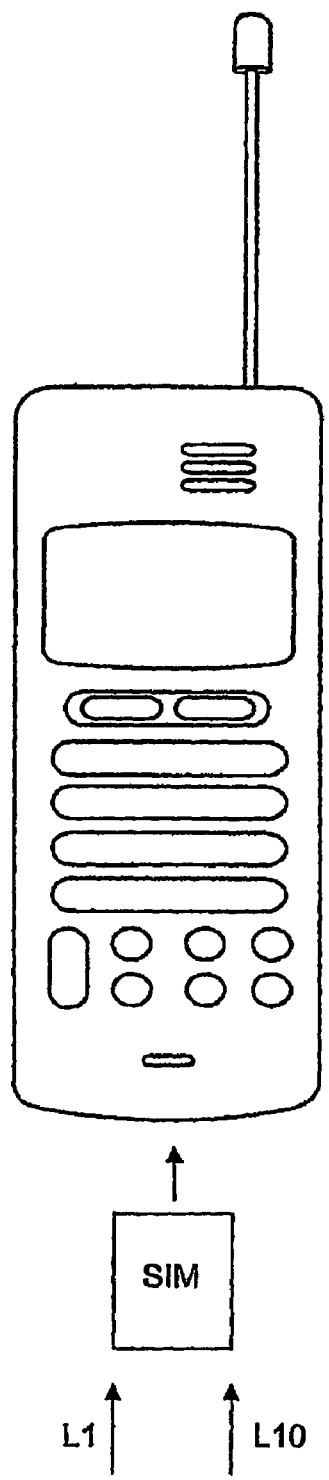
FIG. 14 illustrates schematically a method of assigning a first set of subscriber lines to a user of a mobile wireless communications device and assigning a second set of subscriber lines to a subscriber to a monitoring service, where both sets of lines are associated with a single mobile wireless communications device.

Referring to FIG. 14 herein, there is illustrated schematically a mobile wireless device, e.g. a mobile phone handset, together with a SIM card which fits into the mobile phone handset as is known in the art. The known SIM card is capable of handling a plurality of individual caller lines L1-L10 as shown. Conventionally, each of these individual lines are provided to a single user according to a package of services provided by a network provider.

According to a specific method herein, a first set of lines which can include one or more lines is assigned to a user of the mobile phone for normal communications, and a second set of lines which can comprise one or more lines, is assigned to a user or subscriber to a monitoring service as described herein before.

The covert nature of the monitoring and/or remote control of a monitored device can be maintained by several methods as follows:

Firstly, a subscriber to the monitoring service may be charged for all calls from the handset as well as being charged for all monitoring services. This maintains the covert nature of the monitoring, but the user of the mobile handset is aware that all usage of the handset is being paid for not by themselves, but by someone else.

Secondly, a user of the monitored mobile wireless communications device may be charged for their calls and other communications according to a normal tariff consistent with other non monitored devices, on one or more fines. Additionally, and unknown to the user of the mobile wireless communications device, charges for monitoring services may be billed to a different set of one or more lines, which are also assigned to the same mobile wireless communications device. Invoicing or charging for this second set of lines is made direct to the subscriber for the monitoring service. Therefore, the subscriber of the communications provided by the mobile wireless communications device is unaware that separate invoices for call charges are accrued by a third party subscribing to a monitoring service. Using this method, the subscriber to the communications services provided by the monitored wireless communications device may operate on a "pay as you go" tariff or any other type of conventional tariff, and their usage of the mobile wireless communications device, which in many cases is dependent upon the tariffs and charges provided by the service provider is completely unaffected by any tariffs or charges to a subscriber for the monitoring service, and further, the user of the mobile wireless communications device is totally unaware that any such charges are being made to the subscriber for the monitoring service. In a variation of this method, the subscriber to the monitoring service may be billed by various different tariffs including a "pay as you go" tariff.

Figure 15:
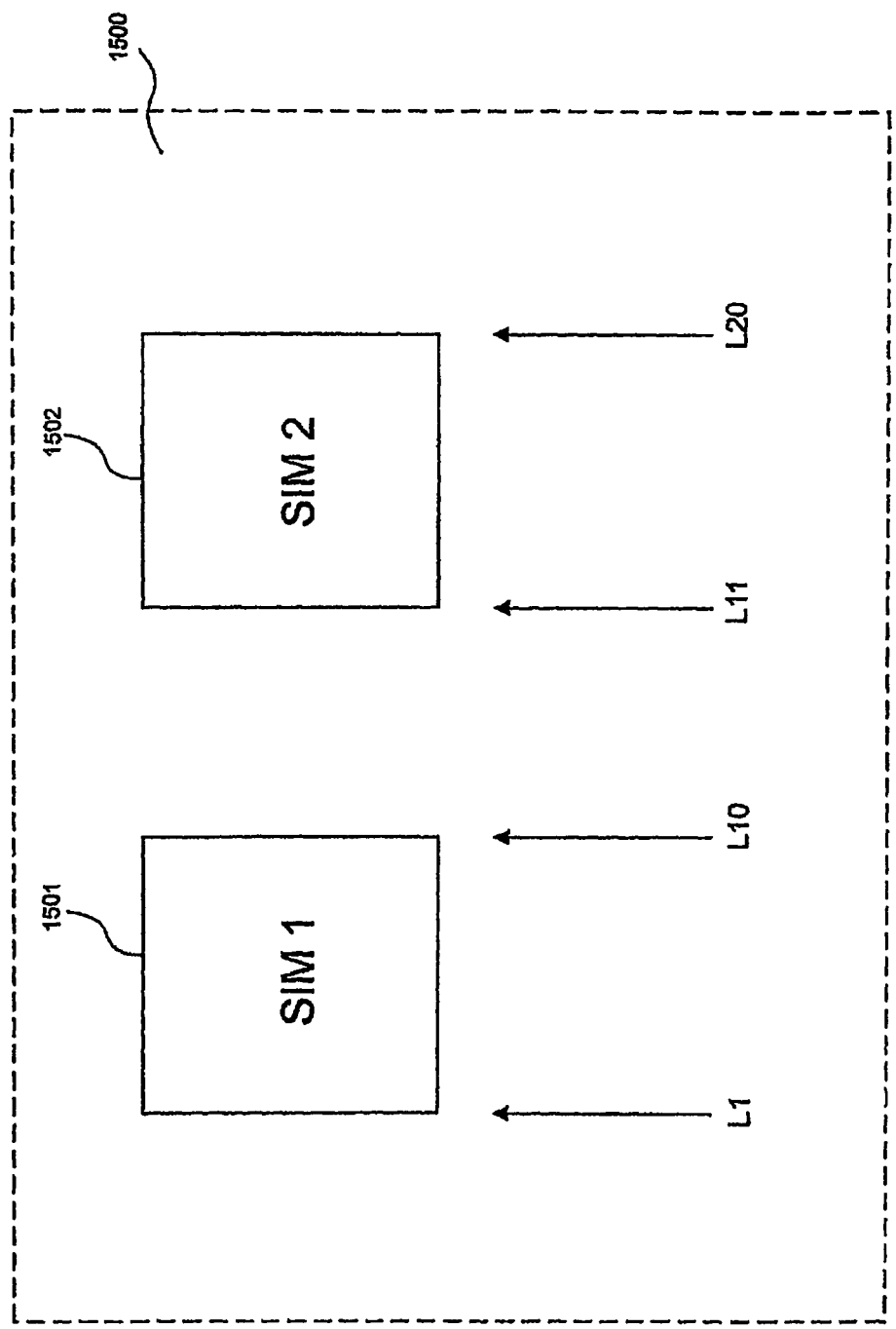
FIG. 15 illustrates schematically an embodiment of a mobile wireless communications device having first and second sets of subscriber lines, where a first set of lines is associated with a first SIM card, and a second set of lines is associated with a second SIM card, the second SIM card being physically concealed within the mobile wireless communications device.

Referring to FIG. 15 herein, there is illustrated schematically a further method of operation of a mobile wireless communications device, adapted for billing a subscriber to a monitoring service, and a subscriber to a communications service provided by the mobile wireless communications device.

Mobile wireless communications device 1500 comprises first and second ports for first and second SIM cards 1501, 1502 respectively. The communications device is engineered and designed such that first SIM card 1501 is removable and interchangeable, and is known in the art, by a user of the mobile wireless communications device. Therefore, from the point of view of a user, the mobile wireless communications device is indistinguishable from other non monitored communications devices of the same or similar type.

However, the device is also engineered and designed such that the second SIM card 1502 is embedded within the device out of sight, and inaccessible by a normal user of the device. Therefore, the user of the device is unaware that the second SIM card is carried by the device.

A first set of lines L1-L10 are assigned to the first SIM card, and are 20 available for use by the user of the mobile wireless communications device according to a set of tariff packages provided by a service provider.

Second SIM card 1502 associates with a second set of lines L11-L20, which are available to a subscriber of a monitoring service, for a variety of purposes, including billing.

Consequently, in this specific method and embodiment, the monitoring service attaches to the second set of lines associated with the second SIM card, which is embedded and hidden within the mobile wireless communications device. Therefore, the service provided to the subscriber for the monitoring service is specific to the particular mobile wireless communications device within which the second SIM card 1502, which is embedded and hidden.

Since normal communication services attach to first SIM card 1501 used by the user, there is a possibility that the user will switch their first SIM card, and substitute it with a further, different SIM card in the first port of the device.

Substituting SIM cards may result in the user of the mobile wireless communications device being billed on a separate set of lines, possibly by a separate service provider, and possibly on a separate tariff. However, since the second SIM card remains embedded within the device, and is not changed, the monitoring services maintained to the subscriber on the same mobile wireless communications device, irrespective of which SIM card is inserted into the first SIM card port of the device. It is envisaged that there may be problems in some devices related to the provision of two SIM cards e.g. difficulty in obtaining a signal or excessive battery usage. It is however envisaged that the second SIM may 'piggyback' the first SIM, i.e. the second SIM may be routed through the first. Additionally, records to be transmitted to the monitoring device may be stored temporarily and only forwarded once the main SIM is not in use. Indeed wherever possible, call conferencing and the like may be achieved through the main SIM.

Both the first SIM card and/or the second SIM card may be connected to a variety of payment tariffs, including "pay as you go tariffs", and charges accumulated to the first SIM card port are billed separately and independently of any charges accumulating to monitoring services assigned to the second SIM port and the second SIM card.

The user of the first SIM card is unaware of any charges being made to a 20 subscriber to the monitoring service, using the second SIM card. However, in some variations of the specific method, the charges accumulated to the lines associated with the first SIM card and the user of the mobile wireless device, may be reported to the user of the monitoring service, as part of the monitoring service, that is, the user of the monitoring service can optionally, in some embodiments, be provided with copies of the charges and/or invoices sent to the user of the mobile communications device.

The method and apparatus may have various applications.

Regulation and compliance—in modern financial organizations, communications may be made either by land lines, or mobile phones, or personal computer devices such as a PDF, or by an internet or wireless enabled portable device such as a laptop computer. To prevent insider trading, or fraudulent trades being conducted, there are legal requirements that organizations comply with financial services legislation and rules, and a large number of city jobs are involved in regulation and compliance and trading activities. Compliance officers may monitor the phone calls of trading staff and financial advisers to ensure that their advice is proper and complies with financial legislation, and to ensure that fraudulent or illegal transactions are detected by the organization. For example, a monitored communications apparatus may be issued to an employee of an organization, for example a financial organization, and monitoring may be performed by the regulation and compliance department of the financial organization ensuring that all financial transactions carried out comply with the rules and laws of a national or regional stock exchange. Calls may be regularly monitored and recorded, without the specific knowledge of the user of the monitored apparatus in order to monitor the trading activities and business activities of the employee and ensure that these do not violate local stock exchange rules.

Alternatively, monitorable communications devices may be issued to staff in an organization, and voice phone calls may be regularly monitored either by an automatic monitoring device or individual human persons, for the purpose of training.

Further, the apparatus may have covert information collecting application, for example for covertly monitoring the activities of suspecting criminals or terrorists.

Training staff—By monitoring the incoming and outgoing communications of staff in an organization, senior managers or other executives can improve the productivity and service given by employees by feeding back information concerning their communications via training sessions.

Compliance with corporate policy—many corporations have policies in place concerning compliance with employment and health and safety legislation, and ethical policies. For example, such policies may include prohibitions on certain types of communications, for example downloading information of an illegal nature, downloading or communication with a terrorist of criminal organizations, or communication of pornographic material between employees. By monitoring in real time and/or recording the content of calls on pre-determined monitored devices issued to employees, the corporation can ensure compliance with its own corporate policies, employment legislation, and health and safety legislation.

Improving management efficiency—In some corporations, a group of workers receiving and sending communications calls may each report to a line manager who organizes the work flow and allocates tasks to under utilized or least busy employees. By regularly monitoring in real time, outgoing and incoming calls to each employee, a line manager may be able to more efficiently allocate work load and improve productivity of the team of workers. However, since monitoring is covert and the employees cannot tell when their calls are being monitored, the monitoring is invisible to the employees and therefore does not psychologically inhibit the employees from carrying on their work, or distract the employees. The employees would not be aware that their calls were being monitored. The monitoring operation is therefore non intrusive on the work operation carried out by the employees making the calls.

Conference call recording—a conference call between a monitored device and one or more third party devices may be covertly recorded, so that a full non repudiable record of the conference call can be recorded without any of the parties participated in the conference call being interrupted by the recording or monitoring procedure. This may have application, for example within organizations having disparate corporate sites, for example in different countries, which communicate by a conference call. A recorded conference call session may provide an accurate record of decisions taken at a conference meeting, without the need to type up a separate memorandum and have the memorandum checked by all parties to the call. Similarly, a conference call between two or more different organizations may be recorded. In such a conference call, verbal agreements may be reached which bind parties to the call. Covert monitoring of the call and recording of all elements of the call from all parties may provide a non repudiable record of the verbal agreements and decisions taken during the conference call.

Alternatively, and optionally, a person issued with a monitored device, e.g. a monitored mobile phone may be made aware that the device does have a facility whereby automatic monitoring will take place. However, the user of the device will still be unaware at the time of a communication, that the monitored device is operating to communicate with a monitoring device for monitoring a call. Therefore, in general terms a person having monitoring permissions on a system may make aware a user of a monitored device, that call monitoring is taking place for specific reasons, e.g. company policy, training etc. However, at the time of making a communication, the user of the monitored device would not receive any indication or signal from the monitored device or elsewhere that the call is being monitored, and therefore from that point of view, at the time of communication, any monitoring performed would be made covertly, without interrupting the communication of the user of the monitored device, and without specifically alerting the user of the monitored device that monitoring is taking place.

In the general case, the monitored device and system as disclosed herein has the technical capability to provide covert monitoring of a monitored device. The extent to which a user may be made aware in a general sense that communications monitoring is taking place may depend upon the laws and regulations of the country or territory in which the system is used, and/or the policies of the organization which operates the system and monitored devices. The system described herein has the capability of covert monitoring of a communications device. Whether or not a user of the system wishes to inform a user of a monitored device that they are being monitored or not is at the option of the organization who controls the monitoring system. It is anticipated that in practice, many instances of use will be where the user of the monitored device is completely unaware that communications using the device are being monitored by a third party, however overt uses are also anticipated. Indeed, it should also be understood that even where it is not explicitly stated, the above invention may be implemented either overtly or covertly as is required or desired.

Where the application above relates to SIM cards, it is to be understood that this may refer to any suitable SIM or any item suitable to operate as a SIM. In particular, such articles may include SIMs adapted to the formats: UICC, USIM, ISIM, R-UIM, W-SIM and any current or subsequent equivalent.

The conferencing and monitoring services provided by the invention may be run on a time interval basis. This may be for instance a monthly or a yearly basis. It may be that it is necessary to enter a code or renew a code in order to renew a subscription to the service.

Where reference is made to CDMA, this is intended to cover all variants to or equivalents of CDMA including but not limited to CDMA2000, CDMA2000 1x, CDMA2000 3x, CDMA2000 IxEV-DO, CDMA2000 IxEV-DV, CDMA 1xWIN and any others. Similarly, such services can be provided on a UTRAN (UMTS) Terrestrial Radio Access Network or other 3G networks.

In embodiments where the invention is implemented by the network provider, the invention may be implemented by use of CAMEL customized applications for mobile networks enhanced logic), which allows an operator to define services over and above standard GSM services. This does not of course mean that the invention cannot be implemented by way of a suitable SIM, independently or in combination with the network operator.

The invention may be implemented on any suitable mobile wireless device including mobile phones, PDAs, Blackberrys, MP3 players, or similar. In the event that the device is operable to browse sires such as WAP sites or internet sites, the monitoring device may preferably be able to receive information indicating which sites are browsed and at which times. The controller may be operable to record only certain selected sites or to allow access to only certain selected sites. Alternatively, the controller may be operable to prevent access to certain selected sites or to only monitor access to certain selected sites.

The monitoring device may be adapted such that it is able to read and view all messages or data input to or received at the monitored device, even encrypted text messages, voice calls or other data. This may either be achieved by copying the relevant keys to the monitoring device or by transmitting the decoded message, voice call or data to the monitoring device, either covertly or overtly, as required or desired. The invention may be operable with any suitable encryption method including but not limited to Blowfish, DES/3DES, RSA, Public Key, Private Key, Rijndael, GOST or similar.

The monitored device may also be provided with key logging means operable to report any or all key strokes made on the monitored device to the monitoring means. The key logging means may in particular be operable in response to the input of particular key word or phrases. This may trigger the copying of data to the monitoring device or the issuing of an alert to the monitoring device.

If the wireless device is provided with means operable to determine its location, this information may be copied back to the monitoring device at any suitable interval. For instance, this information may be copied after a predetermined time interval, after a predetermined distance is traveled or when the unit travels into or outside of a predetermined area.

It is of course to be understood that the invention is not to be restricted to the details of the above embodiments which are described by way of example only.

The invention claimed is:

1. A method of automatically monitoring a wireless communications device, the method comprising:
   monitoring the wireless communication device to identify a change of state in the wireless communications device, the change of state comprising at least one of the capture of data, the reception of data within a message received by the wireless communications device, and the sending of data in an outgoing message from the wireless communications device;
   replicating the captured, sent or received data;
   forwarding the replicated captured, sent or received data to a separate monitoring device,
   selecting the predetermined monitoring device base on a rule applied by a controller of the wireless communications device; and
   automatically establishing a wireless communications channel to the predetermined monitoring device.

2. The method as claimed in claim 1, wherein the change of state further comprises at least one of an interaction with another entity, an operation of the wireless communications device, receipt of a communication from another entity, an outgoing communication from the wireless communications device, an input of data to the wireless communications device via a key pad of the wireless communications device, an input of voice signals from a human user of the wireless communications device, and capture of a moving or still image via a camera device comprising the wireless communications device.

3. The method as claimed in claim 1, wherein the reporting is carried out without requesting consent from a user of the monitored wireless communications device.

4. The method as claimed in claim 1, wherein the reporting of the change of state of the monitored wireless communications device is reported automatically, without any indication of the reporting being received by the monitored wireless communications device.

5. The method as claimed in claim 1, wherein the monitoring of the monitored wireless communications device is carried out without knowledge of a user of the wireless communications device.

6. The method as claimed in claim 1, further comprising:
in response to a reported change of state of the monitored wireless communications device, remotely performing a further operation of the monitored wireless communications device from a remote location, in which a user of the monitored wireless communications device becomes aware that the monitored wireless communications device is being monitored.

7. The method as claimed in claim 1, wherein the communication is monitored by the monitoring device substantially in real time.

8. The method as claimed in claim 1, wherein a configuration of the monitored wireless communications device is monitored.

9. The method as claimed in claim 1, wherein a monitored operation of the monitored wireless communications device comprises a voice call.

10. The method as claimed in claim 1, wherein the monitoring device comprises a mobile phone handset.

11. The method as claimed in claim 1, wherein the monitoring device comprises a recording device capable of recording voice data.

12. The method as claimed in claim 1, comprising monitoring a start time of an operation of the device.

13. The method as claimed in claim 1, is comprising recording an end time of an operation of the monitored wireless communications device.

14. The method as claimed in claim 1, comprising recording an identification data identifying at least one of the monitored wireless communications device.

15. The method as claimed in claim 1, further comprising:
performing a search of the monitoring device, to search a
parameter selected from the set
date of an operation,
start time of an operation,
an operation finish time,
time duration of an operation,
number called, and
a calling number.

16. The method as claimed in claim 1, further comprising:
receiving a remotely sent instruction by the controller; and reconfiguring the controller to permit selective change of the rule in response to the remotely sent instruction.

17. The method as claimed in claim 9, wherein:
the voice call comprises a voice call initiated by the wireless communications device to another entity; and
automatically establishing a wireless communications channel comprises automatically establishing a conference call with the wireless communication device, the called entity, and the monitoring device.

18. A wireless mobile handset, comp comprising:
a display to display data; and
a controller configured to:
identify a change of state of the wireless communications device, the change of state comprising at least one of the capture of data, the reception of data within a message received by the wireless communications device, and the sending of data in an outgoing message from the wireless communications device,
replicate the captured, sent or received data,
select an external monitoring device based on a rule established by the controller of the wireless communications device,
establish a wireless communications channel with the predetermined external monitoring device,
forward, via the communications channel, the replicated captured, sent or received data to the predetermined external monitoring device, and
automatically establish a wireless communications channel to the external monitoring device.

19. A method of automatically monitoring a wireless communications device, the method comprising:
monitoring a voice call initiating by the wireless communication device to another entity to identify a change of state in the wireless communications device, the change of state comprising at least one of the capture of data, the reception of data within a message received by the wireless communications device, and the sending of data in an outgoing message from the wireless communications device;
replicating the captured, sent or received data;
forwarding the replicated captured, sent or received data to a separate monitoring device; and
automatically establishing a conference call with the wireless communication device, the called entity, and the monitoring device.

* * * * *